US005714310A

United States Patent [19]

Noda et al.

[11] Patent Number: 5,714,310

[45] Date of Patent: Feb. 3, 1998

[54] PHOTOGRAPHIC SUPPORT COMPRISING A RESIN LAYER CONTAINING $TIO_2$ PIGMENTS BEING COATED WITH AN ALKALINE EARTH METAL-CONTAINING COMPOUND

[75] Inventors: Touru Noda, Matsudo; Massashi Kubbota, Misato; Akira Uno, Kashiwa, all of Japan

[73] Assignee: Mitsubishi Paper Mills Limited, Tokyo, Japan

[21] Appl. No.: 939,923

[22] Filed: Sep. 2, 1992

Related U.S. Application Data

[62] Division of Ser. No. 760,981, Sep. 17, 1991, Pat. No. 5,173,397, which is a division of Ser. No. 499,659, Mar. 27, 1990, Pat. No. 5,075,206.

[30] Foreign Application Priority Data

| | | | |
|---|---|---|---|
| Mar. 28, 1989 | [JP] | Japan | 1-077549 |
| May 30, 1989 | [JP] | Japan | 1-137125 |
| Sep. 4, 1989 | [JP] | Japan | 1-230085 |

[51] Int. Cl.$^6$ .................... B32B 5/16; G03C 1/76

[52] U.S. Cl. .................... 430/531; 428/328; 428/330; 428/403; 428/690; 430/536; 430/538

[58] Field of Search .................... 430/536, 538, 430/531; 428/328, 330, 403, 690; 106/436, 449

[56] References Cited

U.S. PATENT DOCUMENTS

| | | | |
|---|---|---|---|
| 3,501,298 | 3/1970 | Crawford | 430/538 |
| 4,188,220 | 2/1980 | Kasugai et al. | 430/536 |
| 4,237,206 | 12/1980 | Fujita | 430/538 |
| 4,443,535 | 4/1984 | Kiritani et al. | 430/536 |
| 4,447,524 | 5/1984 | Uno et al. | 430/538 |
| 4,572,893 | 2/1986 | Asao | 430/534 |
| 4,794,071 | 12/1988 | Tomko et al. | 430/536 |
| 4,859,539 | 8/1989 | Tomko et al. | 430/536 |
| 5,075,206 | 12/1991 | Noda et al. | 430/531 |
| 5,173,386 | 12/1992 | Murasawa | 430/84 |

FOREIGN PATENT DOCUMENTS

| | | |
|---|---|---|
| 56-51336 | 5/1981 | Japan . |
| 59-1544 | 1/1984 | Japan . |

*Primary Examiner*—D. S. Nakarani
*Assistant Examiner*—H. Thi Lê
*Attorney, Agent, or Firm*—Cushman Darby & Cushman IP Group of Pillsbury Madison & Sutro LLP

[57] ABSTRACT

A photographic support consisting essentially of a substrate and a resin layer provided on the image forming side of the substrate, said resin layer comprising a specific titanium dioxide pigment and others. This photographic support is excellent in that it has a high brightness and a high apparent whiteness and stability of the apparent whiteness is good; printed image of high sharpness can be formed thereon: and occurrence of die lip stain at production is quite little and thus it has good surface property.

12 Claims, No Drawings

PHOTOGRAPHIC SUPPORT COMPRISING A RESIN LAYER CONTAINING $TiO_2$ PIGMENTS BEING COATED WITH AN ALKALINE EARTH METAL-CONTAINING COMPOUND

This is a division of application Ser. No. 07/760,981, filed Sep. 17, 1991, now U.S. Pat. No. 5,173,397 which is a divisional of application Ser. No. 07/499,659, filed Mar. 27, 1990, now U.S. Pat. No. 5,075,206.

BACKGROUND OF THE INVENTION

This invention relates to a photographic support consisting essentially of a substrate and a resin layer provided at least on the side of the substrate where images are to be formed (hereinafter referred to as "image-forming side"), said resin layer comprising a specific titanium dioxide pigment, etc. More particularly, this invention relates to a photographic support which has a high lightness and a high apparent whiteness, the apparent whiteness being highly stable, and has good surface property on which a highly sharp printed image can be formed and is quite a little in generation of die lip stain at production.

A so-called resin-coated paper for photograph which comprises a substrate at least one side of which is coated with a resin composition comprising titanium dioxide pigment and a polyolefin resin has been known as photographic support. For example, U.S. Pat. No. 3,501,298 discloses a photographic support comprising a paper substrate, both sides of which are coated with a polyolefin resin. Since rapid development treatment has been employed, a polyethylene resin coated paper for photograph comprising a base paper for photographic paper, both sides of which are coated with a polyethylene resin has mainly been practically used as a support for photographic support, titanium dioxide pigment being usually contained in the resin on the image-forming side to give sharpness to images formed thereon.

Hitherto, anatase type and rutile type titanium dioxide pigments have been known as those which are to be contained in the resin layer on the image-forming side of resin-coated paper for photograph. The following titanium dioxide pigments are also known: A titanium dioxide pigment, the surface of which is not subjected to coating treatment; a titanium dioxide pigment, the particles of which are subjected to coating treatment with an inorganic material such as hydrated aluminum oxide, hydrated silicon oxide or the like as disclosed in Japanese Patent Application Kokai Nos. 52-35625 and 57-108849; and a titanium dioxide pigment, the particles of which are subjected to coating treatment with an organic material such as a polyhydric alcohol or a derivative thereof, a polyorganosiloxane or a derivative thereof, or the like as disclosed in Japanese Patent Application Kokai No. 52-35625, Japanese Patent Application Kokoku Nos. 58-43734 and 61-26552 and the like.

Furthermore, several resin-coated papers have been known as photographic supports when especially high sharpness of printed image is required. Examples thereof are as follows: (1) a resin-coated paper which contains a titanium dioxide pigment in the resin layer in a high concentration; (2) a resin-coated paper which contains a rutile type titanium dioxide pigment in the resin layer; (3) a resin-coated paper which contains titanium dioxide in the resin layer with addition of surfactants represented by a metal soap such as zinc stearate, calcium stearate, zinc palmitate and the like; and (4) a resin-coated paper which contains, in the resin layer, a so-called organic material-treated titanium dioxide pigment, the particles of which has been subjected to coating treatment with the organic material as mentioned above.

However, the above photographic supports suffer from some severe problems in sharpness of image and other photographic properties and processability and thus are still not satisfactory.

First, when concentration of titanium dioxide pigment in the resin layer of polyolefin resin-coated paper is increased as in the above (1), a photographic support which can provide printed image of high sharpness can be obtained, but severe problems often occur in photographic properties and productivity. That is, when a polyolefin resin composition, especially a polyethylene resin composition containing titanium dioxide pigment is melt-extruded into a film from a slit die and coated on a substrate, deposits or stains in the form of needles or iciles (hereinafter referred to as "die lip stain") tend to be formed on the tip of die lip in a short time. The die lip stain is very troublesome because it tends to grow larger with the lapse of time. If this die lip stain is formed at the melt-extrusion coating, streaks are formed in machine direction on the surface of the polyolefin resin-coated paper or streak-like flaws are generated due to nonuniform amount of coated resin. Furthermore, the die lip stain sometimes sticks to the substrate to form a foreign matter. Thus, the surface property of the polyolefin resin-coated paper is considerably damaged and such polyolefin resin-coated paper is unsuitable as photographic support which requires superior surface property and loses commercial value. Moreover, in order to completely remove the die lip stain once formed, production must be stopped to clean die lip or exchange die lip. Therefore, much labor and time are required and thus causes considerable reduction of productivity.

Since titanium dioxide pigment contained in the resin layer of polyolefin resin-coated paper for photograph is subjected to severe requirements in its quality, mainly used is a so-called inorganic compound-treated titanium dioxide pigment, the particles of which are subjected to a coating treatment with inorganic compounds such as hydrated aluminum oxide and hydrated silicon oxide and a so-called untreated titanium dioxide pigment which is subjected to no surface treatment is scarcely used. However, when inorganic compound-treated titanium dioxide pigment is used, the larger the number of treatments of the titanium dioxide pigment with inorganic compound, the more the die lip stain formed. On the other hand, when untreated titanium dioxide pigment is used, the resin layer undergoes conspicuous deterioration by light and besides much discoloration with time, although die lip stain occurs less.

In order to solve these problems, for example, Japanese Patent Application Kokai No. 57-108849 discloses a photographic support containing a titanium dioxide pigment, the surface of which is lightly treated with hydrated aluminum oxide. However, this photographic support also has the problems that some die lip stains occur when content of the titanium dioxide pigment in the polyolefin resin composition is considerably increased to obtain printed images of high sharpness.

When a rutile type titanium dioxide pigment is used as titanium dioxide pigment contained in resin layer of polyolefin resin-coated paper as in the above (2), a photographic support which can provide printed images of fairly high sharpness can be obtained as compared with when anatase type titanium dioxide pigment is used. However, another serious problems on photographic properties occur. That is, the resin layer containing titanium dioxide pigment on the image-forming side of the photographic support tends to yellow due to the rutile type titanium dioxide and a printed image having vivid white ground cannot be obtained.

The inventors have found that even if surfactants represented by metallic soaps such as zinc stearate, calcium stearate and zinc palmitate are added when titanium dioxide pigment is contained in resin layer of polyolefin resin-coated paper as in the above (3), sharpness of printed image on the resulting photographic polyolefin resin-coated paper cannot substantially be improved.

Incorporation of titanium dioxide pigment into resin layer of polyolefin resin-coated paper is generally carried out in the following manner: That is, so-called masterbatch comprising the resin and the pigment contained in a high concentration in the resin is prepared by usual melt-kneading machines such as Banbury mixer, kneader and extruder for kneading and this masterbatch is diluted to desired concentration to obtain a polyolefin resin composition, which is coated on a substrate by melt-extrusion. Alternatively, a so-called compound comprising the resin and the pigment contained originally at a desired ratio in the resin is prepared and this compound is coated on a substrate by melt-extrusion.

The main object of containing metallic soap in polyolefin resin-coated paper for photograph is to improve peelability of resin-coated paper from cooling roll of melt extruder in coating resin on a substrate by melt-extrusion.

However, as a result of the research conducted by the inventors, an utterly new fact has been found on the effect of metallic soap contained in resin-coated paper. That is, it has been found that when the metallic soap added in preparation of masterbatch or compound of titanium dioxide pigment is contained in the resin layer in an amount of less than 1.5% by weight based on the weight of titanium dioxide pigment and in an amount of less than 0.15% by weight based on the weight of resin layer, sharpness of printed image increases with increase in the content, but the peelability referred to above is inferior with such content and furthermore, when the metallic soap is contained in an amount of 1.5–7.5% by weight based on the weight of titanium dioxide pigment and in an amount of 0.15–0.75% by weight based on the weight of resin layer, the peelability is improved with increase in the content, but sharpness of printed image is considerably lowered and sometimes becomes lower than when no metallic soap is contained. Furthermore, when metallic soap is contained in an amount of more than 7.5% by weight based on the weight of titanium dioxide pigment and in an amount of more than 0.75% by weight based on the weight of resin layer, sharpness of printed image gradually decreases with increase in the addition amount of the metallic soap and generation of oily smoke increases and processability at melt-extrusion coating of resin composition becomes much inferior. As explained above, even if a metallic soap is added at the time of incorporation of titanium dioxide pigment in resin layer of polyolefin resin-coated paper, there is the problem that photographic support which can afford high sharpness of printed image cannot be obtained.

Furthermore, the inventors have found that even when a so-called organic compound-treated titanium dioxide pigment is used as the titanium dioxide pigment to be contained in resin layer of polyolefin resin-coated paper for photograph as in the above (4), sharpness of printed image is not improved. Moreover, when a metallic soap represented by zinc stearate in such an amount as can give sufficient peelability at preparation of resin-coated paper is added together with an organic compound-treated titanium dioxide pigment to resin layer of polyolefin resin-coated paper, sharpness of printed image on the resin-coated paper is nearly the same as or only slightly higher than when titanium dioxide pigment which has not been treated with organic compound is used.

On the other hand, there have been known some techniques to improve whiteness of resin layer containing titanium dioxide pigment on the image-forming side of resin-coated type photographic supports.

U.S. Pat. No. 3,501,298 discloses that a blue inorganic pigment such as ultramarine, cobalt blue or the like, a red inorganic pigment such as oxidized cobalt phosphate (e.g., Raspberry V-6260 manufactured by Ferro Colors Corp.), or a red organic pigment such as quinacridone red is contained in the resin layer in addition to the titanium dioxide pigment. It is also known to contain a fluorescent agent having bis(alkyl-substituted benzoxazolyl)thiophene structure which is represented by Uvitex OB (trademark for the product manufactured by Ciba Geigy) in resin layer. Japanese Patent Application Kokai No. 51-6531 discloses to contain a titanium dioxide pigment treated with hydrated alumina and a fluorescent agent in resin layer. Japanese Patent Application Kokai No. 53-19021 discloses to contain a blue inorganic pigment such as ultramarine and a red inorganic pigment such as Daiichi Pink DP-1 or Daiichi Violet DV-1 (manufactured by Daiichi Kasei Co.). Further, Japanese Patent Application Kokoku 56-51336 discloses to contain a fluorescent agent having bis(alkyl-substituted benzoxazolyl)naphthalene structure in the resin layer. Japanese Patent Application Kokai No. 61-75341 discloses a technique to incorporate a quinacridone red organic pigment in resin layer. Moreover, U.S. Pat. No. 4,794,071 discloses to contain a mixture of bis(benzoxazolyl)stilbene fluorescent agents.

However, the above enumerated techniques have the following defects.

First, in the technique for improving apparent whiteness of resin layer by diminishing the tendency of yellowing of the resin layer caused by titanium dioxide pigment contained therein at a high concentration by containing an inorganic or organic coloring pigment or coloring dye in a resin layer on the image-forming side of resin-coated paper type photographic support, since color of resin layer is apparently whitened by coloration, brightness is lowered and vivid whiteness cannot be obtained.

Secondly, it has also been found that when a polyolefin resin composition containing a fluorescent agent, especially a bis(benzoxazolyl)naphthalene type fluorescent agent or a bis(benzoxazolyl)stilbene type fluorescent agent and a titanium dioxide pigment, especially an inorganic compound-treated titanium dioxide pigment is melt-extruded into a film from a slit die and coated on a substrate, die lip stain occurs much and, especially when the resin composition additionally contains inorganic or organic color pigment or color dye, especially blue pigment or blue dye, die lip stain is especially conspicuous. Furthermore, as a result of investigation conducted by the inventors, it has been found that considerable die lip stain occurs when a polyolefin resin composition containing an inorganic or organic color pigment or color dye (especially inorganic color pigment) and a titanium dioxide pigment (especially inorganic compound-treated titanium dioxide pigment) is melt-extruded into a film from a slit die and coated on a substrate.

Thirdly, when whiteness of resin layer is improved by containing in the resin layer a fluorescent agent of bis (benzoxazolyl)thiophene structure having a substituent as mentioned in U.S. Pat. No. 3,449,257 or a fluorescent agent of bis(benzoxazolyl)naphthalene structure having a lower alkyl group of 5 or less carbon atoms as mentioned in Japanese Patent Application Kokoku No. 56-51336, the fluorescent agent tends to bleed out of the resin layer and stability of color tone is inferior and besides, adhesion between resin layer and photographic emulsion layer is insufficient. In addition, a photographic support containing the above fluorescent agent is inferior in stability of whiteness and in weathering resistances such as so-called light resistance and discoloration in darkness and undergo yellowing with the lapse of time. Furthermore, photographic materials which comprise, as a support, a resin-coated paper containing in the resin layer a fluorescent brightening agent of bis(benzoxazolyl)thiophene structure having a substituent, a representative of which is Uvitex OB are deteriorated in whiteness and rather are considerably yellowed as compared with conventional photographic materials when treated with an acidic hardening fixer.

SUMMARY OF THE INVENTION

The object of this invention is to provide a photographic support which are superior in that it has high brightness and high apparent whiteness which is stable, it has good surface property on which a highly sharp printed image can be formed and besides die lip stain occurs little in production of the support.

The inventors have conducted an intensive research in an attempt to attain the above object. As a result, it has been found that the above object can be attained by a photographic support which consists essentially of a substrate and a resin layer provided at least on the image-forming side of the substrate, said resin layer comprising a specific titanium dioxide pigment and the like.

According to this invention, there is provided a photographic support consisting essentially of a substrate and a resin layer provided at least on the side of the substrate where images are to be formed, said resin layer comprising (A) a polyolefin resin or a polyolefin resin mixture, (B) a rutile type titanium dioxide pigment and (C) a fluorescent agent, said titanium dioxide pigment having been subjected to at least one treatment selected from the group consisting of (1) a surface treatment with aluminum-containing hydrated metal oxides to coat the titanium dioxide pigment with an aluminum-containing metal composition in an amount of more than 0.2% by weight, but less than 1.5% by weight in terms of anhydrous metal oxide based on the weight of the titanium dioxide pigment and with a silicon composition in an amount of 0 inclusive—0.4 inclusive % by weight in terms of anhydrous silicon dioxide based on the weight of the titanium dioxide pigment and (2) an inside treatment with an aluminum compound to contain, in the titanium dioxide pigment, an aluminum composition in an amount of more than 0.2% by weight, but less than 1.5% by weight in terms of anhydrous aluminum oxide based on the weight of the titanium dioxide pigment, said polyolefin resin having a melt index of more than 4.0, but less than 9.5, said polyolefin resin mixture having a weighted-mean melt index of more than 4.0, but less than 9.5, and said fluorescent agent being a bis-(benzoxazolyl)naphthalene type fluorescent agent having a substituent or a bis(benzoxazolyl)stilbene type fluorescent agent having a substituent (referred to as "first invention" hereinafter).

According to this invention, there is furthermore provided a photographic support consisting essentially of a substrate and a resin layer provided at least on the side of the substrate where images are to be formed, said resin layer comprising (A) a polyolefin resin or a polyolefin resin mixture, (B) a rutile type titanium dioxide pigment, (C) a fluorescent agent, and at least one member selected the group consisting of (D) a color pigment and a color dye, said titanium dioxide pigment having a number-average diameter of 0.110–0.150 μm and having been subjected to at least one treatment selected from the group consisting of (1) a surface treatment with aluminum-containing hydrated metal oxides to coat the titanium dioxide pigment with (a) an aluminum-containing metal composition in an amount of more than 0.2% by weight, but less than 1.8% by weight in terms of anhydrous metal oxide based on the weight of the titanium dioxide pigment and (b) a silicon composition in an amount of 0 inclusine—0.4 inclusine % by weight in terms of anhydrous silicon dioxide based on the weight of the titanium dioxide pigment and (2) an inside treatment with an aluminum compound to contain, in the titanium dioxide pigment, an aluminum composition in an amount of more than 0.2% by weight, but less than 1.8% by weight in terms of anhydrous aluminum oxide based on the weight of the titanium dioxide pigment, and said fluorescent agent being a bis (benzoxazolyl)naphthalene type fluorescent agent having a substituent or a bis(benzoxazolyl)stilbene type fluorescent agent having a substituent (referred to as "second invention" hereinafter).

According to this invention, there is additionally provided a photographic support consisting essentially a substrate and a resin layer provided at least on the side of the substrate where images are to be formed, said resin layer comprising (A) a polyolefin resin or a polyolefin resin mixture, (B) a titanium dioxide pigment, (C) an antioxidant, said titanium dioxide pigment having a number-average diameter of 0.110–0.150 μm and having at least one compound selected from the group consisting of a magnesium compound, a calcium compound and a barium compound supported on the surface thereof in amount of 0.004–0.1% by weight in terms of metal based on the weight of the titanium dioxide pigment (referred to as "third invention" hereinafter).

DETAILED DESCRIPTION OF THE INVENTION

In this invention, a resin layer is provided at least on the image-forming side of a substrate.

In the first invention, the resin layer contains, as essential components, (A) a polyolefin resin or a mixture of polyolefin resins, (B) a titanium dioxide pigment and (C) a fluorescent agent.

In the second invention, the resin layer contains, as essential components, (A) a polyolefin resin or a mixture of polyolefin resins, (B) a titanium dioxide pigment, (C) a fluorescent agent and (D) a color pigment and/or a color dye.

In the third invention, the resin layer contains, as essential components, (A) a polyolefin resin or a mixture of polyolefin resins, (B) a titanium dioxide pigment and (C) an antioxidant.

The first invention is explained.

The titanium dioxide pigment used in the first invention has rutile structure. This titanium dioxide pigment is (1) one which has been subjected to a surface treatment with an aluminum-containing hydrated metal oxide to coat the surface of titanium dioxide with an aluminum-containing metal composition in an amount of more than 0.2% by weight, but less than 1.5% by weight in terms of anhydrous metal oxide based on the weight of the titanium dioxide pigment and with a silicon composition in an amount of 0–0.4% by weight in terms of anhydrous silicon dioxide based on the weight of the titanium dioxide pigment and/or (2) one which has been subjected to an inside treatment with an aluminum compound to contain an aluminum composition in an amount of more than 0.2% by weight, but less than 1.5% by weight in terms of anhydrous aluminum oxide based on the weight of the titanium dioxide pigment.

Particle diameter of the titanium dioxide pigment used in the first invention is not critical, but is preferably about 0.04–0.5 μm and more preferably about 0.08–0.2 μm (considering sharpness of printed image) in number-average diameter measured in a certain direction by electron microscope.

Representative methods for preparation of rutile type titanium dioxide pigment used in the first invention include sulfuric acid method and chlorine method.

The sulfuric acid method comprises the following steps:

Raw titanium dioxide→digestion.extraction→
allowing to stand.crystallization→filtration.
concentration→hydrolysis→washing→
calcination→grinding.dressing of grain→wet
grinding.classification→surface treatment→
washing.drying→finishing grinding→titanium
dioxide pigment In case of the sulfuric acid method, usually ferric sulfate is crystallized from a solution of ilmenite in sulfuric acid and is removed to obtain an aqueous titanyl sulfate solution, which is hydrolyzed to obtain a hydrated titanium dioxide. This hydrated titanium dioxide is calcined to improve properties as pigment. The hydrolysis of aqueous titanyl sulfate solution can be carried out by so-called self seed method which comprises adding titanyl sulfate solution to warm water to precipitate hydrated titanium dioxide, which is used as a seed or so-called external seed method which comprises adding to titanyl sulfate solution a hydroxide of titanium prepared by hydrolyzing titanyl sulfate or titanium tetrachloride as a seed. The calcination is carried out at 800°–1100° C., namely, at a calcination temperature higher than that for preparation of titanium dioxide of anatase structure or in the presence of a compound containing metals such as sodium, potassium and zinc to accelerate formation of rutile structure at calcination. The term "rutile type titanium dioxide" used in the present invention means a titanium dioxide pigment in which 90% by weight or more, preferably 95% by weight or more of the crystal structure has been converted to rutile structure.

According to the chlorine method, titanium dioxide particles are formed by vapor phase calcination decomposition of titanium tetrachloride at high temperature and in oxygen atmosphere and generally those of rutile structure are obtained.

The chlorine method comprises the following steps.

Highly purified titanium dioxide or synthetic
rutile type titanium oxide→chlorination→
separation.condensation→purification→
preheating→calcination.decomposition→
separation→grinding.dressing of grain→
wet grinding.classification→surface
treatment →washing.drying→finishing
grinding→titanium dioxide pigment The product obtained by calcination or vapor phase calcination decomposition is referred to as "titanium dioxide clinker" hereinafter. The titanium dioxide clinker is dry-ground by a centrifugal roller mill such as Raymond mill or a fluid energy mill such as air mill. The ground product is suspended in water to make a titanium dioxide slurry. This slurry is wet-ground in a wet ball mill or a vibration mill and is wet-classified by centrifugal separation using a continuous horizontal centrifugal separator and/or by passing through a vibration double deck screen (U.S. standard screen: 325 meshes) to obtain a titanium dioxide slurry called "fines" substantially free from coarse particles of titanium dioxide. In case of surface treating titanium dioxide, the surface of the fines from which coarse particles have been removed and are still in the form of slurry is coated with an aluminum-containing hydrated metal compound. After the surface treatment, the slurry is subjected to filtration and washing with water using a filter press and is further ground finely in an impact grinder and/or a fluid energy mill to obtain a titanium dioxide pigment.

The rutile type titanium dioxide pigment used in the first invention include one which has been subjected to a surface treatment with a specific amount of an aluminum-containing hydrated metal oxide or one which has been subjected to an inside treatment with a specific amount of an aluminum compound or one which has been subjected to both the surface treatment and the inside treatment. Especially, when titanium dioxide pigment is produced by sulfuric acid method, one which has been subjected to the surface treatment with a specific amount of an aluminum-containing hydrated metal oxide is preferred from the point of designing of titanium dioxide pigment.

The surface-treated rutile type titanium dioxide pigment used in the first invention is prepared by subjecting titanium dioxide to wet grinding and classification and then to a surface treatment with a aluminum-containing hydrated metal oxide to coat the surface of titanium dioxide with an aluminum-containing metal composition in an amount of more than 0.2% by weight, but less than 1.5% by weight in terms of anhydrous metal oxide based on the weight of the titanium dioxide pigment and a silicon composition in an amount of 0–0.4% by weight in terms of anhydrous silicon dioxide based on the weight of the titanium dioxide pigment. If amount of the metal composition is 0.2% by weight or less, not only weathering resistance of resin layer of resin-coated paper in which the titanium dioxide pigment is contained is deteriorated, but also fine foreign matters or fine particles called microgrit may occur much. If amount of the metal composition is 1.5% by weight or more, die lip stain occurs much and further, microgrit appears much. Amount of the metal composition is preferably 0.4–1.25% by weight, more preferably 0.5–1.0% by weight in terms of anhydrous metal oxide based on the weight of titanium dioxide. The aluminum-containing hydrated metal oxide is preferably a hydrated aluminum oxide. Amount of the silicon composition is 0–0.4% by weight, preferably 0–0.2% by weight in terms of anhydrous silicon dioxide. Other hydrated metal oxides such as hydrated titanium oxide and the like can be used so that titanium dioxide is coated with other metal components such as titanium and the like in a total amount of 0–1.5% by weight in terms of anhydrous metal oxide. It is also possible to carry out the surface treatment with a hydrated aluminum silicon oxide so as to coat the titanium dioxide with a silicon component in an amount of 0–0.4% by weight in terms of anhydrous silicon dioxide.

The surface treatment of titanium dioxide particles with a hydrated metal oxide can be carried out by the following method: That is, titanium dioxide slurry is subjected to wet grinding and classification and then is adjusted to pH of preferably 5 or more, more preferably 6 or more, further preferably about 7. Thereafter, to the slurry is added a water-soluble aluminum slit and, if necessary, other slightly soluble metal (e.g., slightly soluble silicon compound) and subsequently pH of the slurry is varied to precipitate a slightly soluble hydrated aluminum oxide and, if necessary, other slightly soluble hydrated metal oxide on the surface of titanium dioxide pigment. For example, explanation will be made with reference to a representative method of carrying out the surface treatment using a reaction tank provided with a stirrer. That is, a solution of water-soluble alkali compounds such as sodium hydroxide or potassium hydroxide is added to the titanium dioxide slurry after subjected to wet grinding and classification to adjust pH of the slurry to 7.0±1.0. To the pH-adjusted titanium dioxide slurry is added an aluminate such as an alkali metal salt of aluminic acid and, if necessary, additionally, an aqueous solution of a water-soluble alkaline compound such as sodium hydroxide or potassium hydroxide to reduce pH of the slurry to show alkalinity and besides, a mineral acid such as sulfuric acid or hydrochloric acid or an aqueous solution of a salt which reacts as an acid is added to the slurry to precipitate hydrated aluminum oxide on the surface of titanium dioxide particles. Thus, the surface treatment is accomplished. The pH of the titanium dioxide slurry after subjected to surface treatment is usually within the range of 7.0±1.0. Sodium aluminate is especially useful among the alkali metal salts of aluminic acid. Besides the aluminates, other inorganic compounds may also be used for the surface treatment. In this case, this inorganic compound can be added at optional stage of before, during or after the addition of aluminate, but advantageously before addition of aluminate. As the inorganic compounds used for surface treatment in addition to aluminate, there may be used various compounds, for example, silicon compounds such as alkali metal salts of silicic acid and silicon tetrachloride, titanium compounds such as titanium tetrachloride, other metal compounds such as those of zirconium, zinc, magnesium and manganese and phosphorus compounds.

The inside-treated rutile type titanium dioxide pigment used in the first invention is produced by subjecting to inside treatment with an aluminum compound to contain, in the titanium dioxide pigment, an aluminum composition in an amount of more than 0.2% by weight, but less than 1.5% by weight in terms of aluminum oxide based on the weight of the titanium dioxide pigment. If amount of the aluminum composition is 0.2% by weight or less, weathering resistance of the resin layer of photographic supports which contains the titanium dioxide is deteriorated. If amount of the aluminum composition is 1.5% by weight or more, die lip stain occurs much and microgrit also appears much. The amount of the aluminum composition is preferably 0.4–1.25% by weight in terms of aluminum oxide based on the weight of the titanium dioxide pigment. As aluminum compounds used for inside treatment of titanium dioxide pigment, mention may be made of aluminum compounds such as aluminum chloride, aluminum sulfate, aluminum hydroxide, and sodium aluminate, and preferably aluminum chloride and aluminum sulfate when the titanium dioxide pigment is produced by sulfuric acid method. When the titanium dioxide pigment is produced by chlorine method, aluminum chloride is preferred. Inside treatment of the titanium dioxide pigment with aluminum compound is carried out by adding aluminum compound to titanium composition before calcination step when the titanium dioxide pigment is produced by sulfuric acid method. Preferably, after hydrolysis, the resulting hydrated titanium oxide composition was washed and concentrated by a filter and the like and is put in a mixer such as a kneader and well mixed with addition of aluminum compound or the hydrated titanium oxide composition is redispersed in water in a mixing tank with a stirrer and well mixed with aluminum compound and thereafter the composition is subjected to calcination. In case of chlorine method, titanium tetrachloride and oxygen and aluminum compound, preferably aluminum chloride are fed to the calcination decomposition step using an apparatus disclosed, for example, in U.S. Pat. No. 3,121,641.

In view of the effective prevention of the microgrit of the photographic support containing the titanium dioxide pigment, the rutile type titanium dioxide pigment used in the first invention is preferably washed with water after the surface treatment or after the wet grinding and classification when the surface treatment is not carried out, until the suspension electric conductivity of the titanium dioxide pigment defined below becomes 60 μΩ/cm or less.

In a 100-ml-volume beaker is placed a rotator for a magnetic stirrer (manufactured by Universal Co., Ltd., treated with Teflon, having a length of 45 mm and a diameter of 8 mm) and 100 ml of distilled water (at 21.5° C.) is poured into the beaker, and then 10.0 g of the titanium dioxide pigment is added thereto. After that, the beaker is placed on the stage of a magnetic stirrer (manufactured by Yamato Kagaku K.K., type MH-61). In the liquid in the beaker is fixed a conductivity cell [manufactured by Toa Denpa Kogyo K.K., type CG-2001PL (θ=0.1)] attached to an electric conductivity meter (manufactured by Toa Denpa Kogyo K.K., model CM-5B) out of touch with the rotator so as to trace the value of the electric conductivity with the lapse of time. After fixing the cell, the magnetic stirrer is started so that the rotator is rotated at 420 rpm, in order to stir the composition in the beaker and the composition into a suspension of the titanium dioxide pigment. The suspension of the titanium dioxide pigment is stirred for 16 minutes keeping the temperature of the dispersion at 21.5°±0.5° C. 16 Minutes after the start of stirring, the suspension electric conductivity of the titanium dioxide pigment at a liquid temperature of 21° C. is measured with stirring. From the electric conductivity measured above, the electric conductivity at 25° C. is calculated. The electric conductivity thus obtained is defined as the suspension electric conductivity of the titanium dioxide pigment in this specification.

The rutile type titanium dioxide pigment advantageously used in the first invention, the suspension electric conductivity of which is 60 μΩ/cm or more is prepared as follows: After the surface treatment, the original composition of the titanium dioxide pigment is filtered by a filter press, and subsequently the titanium dioxide cake in the filter press is washed with flowing water until the suspension electric conductivity of the titanium dioxide pigment becomes 60 μΩ/cm or less.

The conditions for washing with water such as washing time, the amount of the water used, the pressure of the water and the like can be determined as follows: The titanium dioxide washed with water under a series of combinations of acid-washing conditions is dried and subsequently ground to prepare the titanium dioxide pigment. The suspension electric conductivity of the titanium dioxide pigment thus obtained is measured to find combinations of the acid-washing condition, under which the suspension electric conductivity of the titanium dioxide pigment becomes 60 μΩ/cm or less.

After the surface treatment, the reaction mixture containing the titanium dioxide can be washed with water as such or in the form of the suspension obtained by suspending the titanium dioxide cake again in the bath of the filter press. As the water, stored water or flowing water which slowly displaces the supernatant can be used. Washing with water may be carried out simultaneously with washing with water in the filterpress or separately. The suspension electric conductivity of the titanium dioxide pigment used in this invention is preferably 55 μΩ/cm or less, more preferably 50 μΩ/cm or less in view of further prevention of the microgrit.

In view of more effective prevention of the microgrit and obtained higher sharpness of the printed image of the resin-coated paper for photograph containing the rutile type titanium dioxide pigment used in the first invention, it is advantageous that the titanium dioxide cake is washed with water and dried and then the dry titanium dioxide is finely ground in a fluid energy mill to produce the titanium dioxide pigment. As the fluid energy mill, a steam mill such as a micronizer is preferably used; however, an air mill may be used in combination. It is especially preferable that grinding of the first step is carried out in an impact grinder such as hammer mill and then, as grinding of the second step, fine grinding is carried out in the fluid energy mill.

The rutile type titanium dioxide pigment used in the first invention may be, if necessary, treated with various organic compounds such as triethanolamine, trimethylolpropane, a metal salt of a fatty acid, polyorganosiloxane and the like.

In the first invention, the resin layer contains, as an essential component, a polyolefin resin or a polyolefin resin mixture comprising two or more polyolefin resins. Melt Index (hereinafter referred to as "MI") of the polyolefin resin is more than 4.0, but less than 9.5. Weighted-mean melt index of the polyolefin resin mixture is more than 4.0, but less than 9.5.

MI of polyolefin resin is measured at 190° C. under a load of 2.16 kgf in accordance with JIS K 7210 before being mixed with other components.

Weighted-mean MI of polyolefin resin mixture is calculated from MI of respective polyolefin resins constituting the mixture measured under the above conditions before being mixed. In this case, MI of respective polyolefin resins may be 4.0 or less or 9.5 or more. When weighted-mean MI of the polyolefin resin mixture is more than 4.0 but less than 9.5, the object of this invention can be accomplished.

When resin layer contains the single polyolefin resin, if MI of the polyolefin resin is 4.0 or less, die lip stain cannot be prevented at production of photographic support and if it is 9.5 or more, not only considerable neck-in occurs, but also thickness of resin layer is ununiform and surface property of photographic support is deteriorated. When resin layer contains the polyolefin resin mixture, if weighted-mean MI of the polyolefin mixture is 4.0 or less, formation of die lip stain cannot be prevented at production of photographic support and if it is 9.5 or more, not only considerable neck-in occurs at production of photographic support, but also thickness of resin layer is ununiform and surface property of photographic support is deteriorated.

MI of the polyolefin resin and weighted-mean MI of the polyolefin resin mixture are preferably 5–8.

In the first invention, resin layer on the image-forming side may have a multi-layer structure. For example, the resin layer may have an outer layer comprising a polyolefin resin mixture having a weighted-mean MI of more than 4.0, but less than 9.5 and an inner layer comprising a polyolefin resin having a weighted-mean MI of 2–10.

As examples of the polyolefin resin and the polyolefin resins constituting the polyolefin resin mixture used in the first invention, mention may be made of homopolymers such as polyethylene, polypropylene, polybutene, polypentene and the like; copolymers comprising two or more α-olefins such as ethylene-propylene copolymer and ethylene-butylene copolymer. From the points of economy and melt-extrusion coatability, preferred are polyethylene type resins such as, for example, low-density polyethylenes; medium-density polyethylenes; high-density polyethylenes; straight-chain low-density polyethylenes; copolymers of ethylene with α-olefins such as propylene and butylene; and carboxy-modified polyethylene. The polyolefin resin and polyolefin resins constituting the polyolefin resin mixture may have various densities, molecular weights and molecular weight distributions, and preferably they have a density of 0.90–0.97 and a molecular weight of 20,000–250,000.

For containing the rutile type titanium dioxide pigment used in the first invention in resin composition for making photographic support, the following two methods are usually employed: That is, titanium dioxide pigment is previously contained in polyolefin resin at a certain concentration to make a so-called masterbatch and this masterbatch is diluted to the desired concentration with a diluent resin and this is used as resin composition. Alternatively, a so-called compound is prepared which comprises a polyolefin resin containing titanium dioxide pigment at the desired concentration and this compound is used as resin composition. For preparation of these masterbatches and compounds, a Banbury mixer, a kneader, a kneading extruder, a twin-roll mill, a triple-roll mill and the like are usually employed. Among them, Banbury mixer and kneading extruder are advantageously used. These may be used in combination of two or more.

In order to improve peelability in making resin-coated paper for photograph, it is preferred to add a metal salt of fatty acids to masterbatch or compound of titanium dioxide pigment during preparation thereof and thus to contain the metal salt in the resin layer of resin-coated paper for photograph. These metal salts of fatty acids include, for example, zinc stearate, calcium stearate, aluminum stearate, magnesium stearate, zirconium octylate, sodium palmiate, calcium palmitate and sodium laurate. Amount of these metal salts to be added is preferably 0.1–50% by weight based on the weight of titanium dioxide pigment and 0.01–5% by weight based on the weight of resin composition containing titanium dioxide pigment.

When content of rutile type titanium dioxide in the resin layer in the first invention is 7% by weight or less based on the weight of resin, sharpness of printed image formed is insufficient and when it is 35% by weight or more, flowability decreases and extrusion property is deteriorated or occurrence of die lip stain is conspicuous. The content is especially preferably 9–35% by weight.

Examples of the substituent-containing bis(benzoxazolyl) naphthalene fluorescent agent or substituent-containing bis (benzoxazolyl)stilbene fluorescent agent used in the first invention are as shown by the following formulas. The naphthalene type fluorescent agents are preferably those which have a substituent of 6 or more carbon atoms in view of prevention of breeding-out.

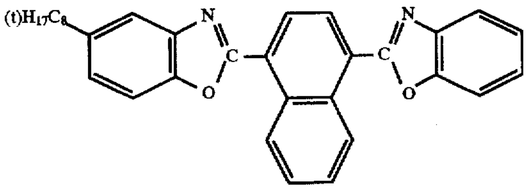
(I)
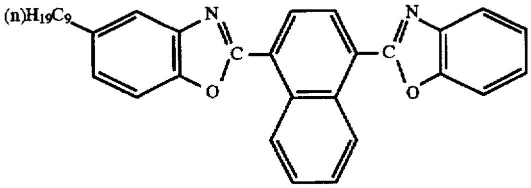
(II)
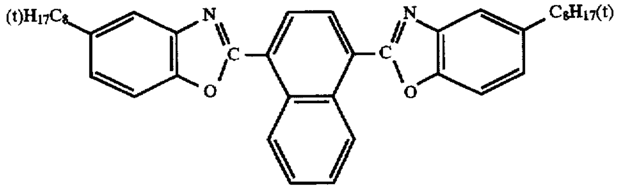
(III)
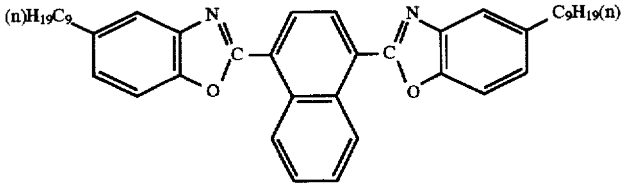
(IV)
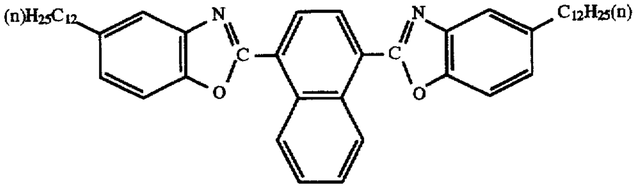
(V)
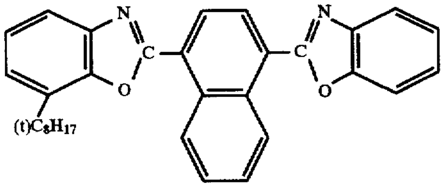
(VI)
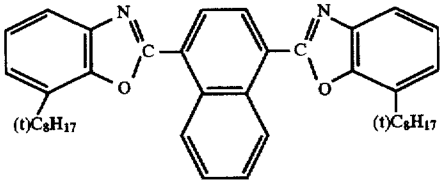
(VII)
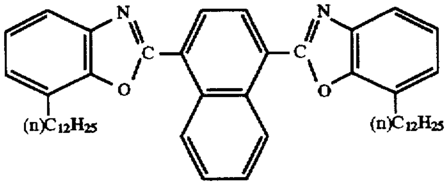
(VIII)
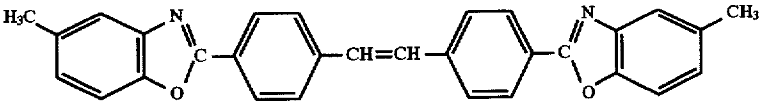
(IX)

-continued

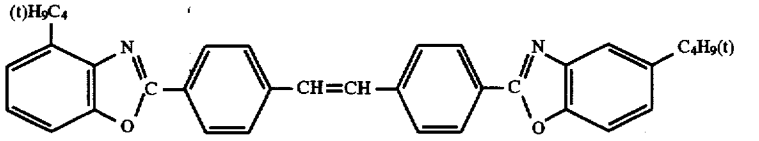

(X)

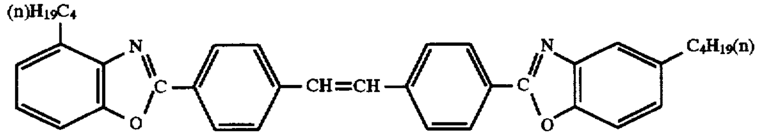

(XI)

For containing the fluorescent agent in polyolefin resin composition, the fluorescent agent is added in preparing a masterbatch or compound of titanium dioxide pigment to make masterbatch or compound comprising titanium dioxide pigment, fluorescent agent, polyolefin resin and dispersant such as metal salt of fatty acid, thereby to contain the fluorescent agent in the resin composition.

It is also possible to contain the fluorescent agent in the resin composition by preparing fluorescent masterbatch by dispersing in the main polyolefin resin the fluorescent agent preliminarily mixed with a low molecular weight polyolefin which has lower softening point than the main polyolefin resin and is solid at room temperature or/and a dispersant such as metal salt of fatty acid. Content of the fluorescent agent in the resin composition is 0.3–25 $mg/m^2$ from the points of whiteness, anti-breeding out and occurrence of die lip stain. If it is less than 0.3 $mg/m^2$ apparent whiteness is considerably insufficient and if it is more than 25 $mg/m^2$, tendency to form die lip stain is conspicuous. The range of 0.5–10 $mg/m^2$ is especially preferred.

In the first invention, it is preferred to contain inorganic or organic blue pigment or blue dye in resin layer to further improve apparent whiteness by synergistic effect of the pigment or dye and the fluorescent agent. Examples of the inorganic blue pigments and dyes are cobalt blue, Prussian blue and ultramarine and examples of organic blue pigments and dyes are cerulean blue, Phthalocyanine Blue and Chromophthal Blue A3R. Amount of the pigment or dye to be added to resin layer is preferably 0.025–0.5% by weight, more preferably 0.05–0.2% by weight for inorganic blue pigment and is preferably 0.001–0.1% by weight, more preferably 0.0025–0.05% by weight for organic blue compound. If the amount is too small, sufficient coloring effect cannot be obtained and if it is too large, not only brightness decreases, but also die lip stain is very conspicuous.

Furthermore, it is advantageous to contain inorganic or organic magenta pigment or dye in the resin layer. Examples of these pigment and dye are cobalt violet, fast violet, manganese purple and quinacridone red. Amount of these pigment and dye added to resin layer is preferably 0.025–1.0% by weight, more preferably 0.1–0.4% by weight for inorganic magenta pigment and is preferably 0.001–0.03% by weight, more preferably 0.002–0.015% by weight for organic magenta pigment.

It is preferred to contain an antioxidant in the resin layer in order to more effectively prevent die lip stain in production of resin-coated paper. As the antioxidant, there may be used various antioxidants such as phenol type, amine type and phosphate type as far as no troubles are caused when used in resin composition for photograph, but especially preferred are hindered phenol type antioxidants because they have no adverse effect on photographic emulsion layer and die lip stain can be more effectively inhibited.

As these advantageous hindred phenol type antioxidants, mention may be made of, for example, 1,3,5-trimethyl-2,4,6-tris(3,5-di-tert-butyl-4-hydroxybenzyl)benzene, tetrakis [methylene(3,5-di-tert-butyl-4-hydroxy-hydrocinnamate)] methane, octadecyl-3,5-di-tert-butyl-4-hydroxyhydrocinnamate, 2,2',2"-tris[3,5-di-tert-butyl-4-hydroxphenyl)propionyloxy]ethylisocyanurate, 1,3,5-tris(4-tert-butyl-3-hydroxy-2,6-di-methylbenzyl)isocyanurate, tetrakis-(2,4-di-tert-butylphenyl)-4,4'-biphenylenediphosphite, 4,4'-thiobis-(6-tert-butyl-o-cresol), 2,2'-thiobis-(6-tert-butyl-4-methylphenol), tris-(2-methyl-4-hydroxy-5-tert-butylphenyl)butane, 2,2'-methylene-bis-(4-methyl-6-tert-butylphenol), 4,4'-methylene-bis-(2,6-di-tert-butylphenol), 4,4'-butylidenebis-(3-methyl-6-tert-butylphenol), 2,6-di-tert-butyl-4-methylphenol, 4-hydroxymethyl-2,6-di-tert-butylphenol, and 2,6-di-tert-4-n-butylphenol. These antioxidants may be used in combination of two or more depending on properties of them.

Content of the antioxidant in resin composition is 5–1000 ppm, preferably 10–500 ppm, more preferably 20–300 ppm in weight ratio. If it is less than 5 ppm or more than 1000 ppm, die lip stain readily occurs. In case of more than 1000 ppm, adhesion between base paper and resin layer is inferior. For containing antioxidant in resin composition, there may be used a so-called compound comprising a polyolefin resin used in which antioxidant has been contained. Alternatively, there may be used a proper amount of resin in which antioxidant is contained at a relatively high concentration or antioxidant may be added during preparation of resin composition by a kneader. Further, these methods may be suitably combined depending on kind and content of the antioxidant.

The resin layer contains (A) a polyolefin resin or a polyolefin resin mixture, (B) a rutile type titanium dioxide pigment and (C) a fluorescent agent as essential components and preferably further contains the above-mentioned inorganic or organic blue pigments or blue dyes, metal salts of fatty acids, antioxidants and inorganic or organic magenta pigments or magenta dyes. When resin layer has multi-layer structure, any layers may contain the above titanium dioxide pigment, fluorescent agent, color pigment or color dye, metal salt of fatty acid and antioxidant.

Furthermore, in the first invention, the resin layer provided on the image-forming side of photographic support and, if necessary, the resin layer provided on back side may further contain various additives, in proper combination, such as white pigments (e.g., other titanium dioxide, zinc oxide, talc, and calcium carbonate), fatty acid amides (e.g., stearic acid amide and arachic acid amide), organosilicone compounds (e.g., polyorganosiloxane), ultraviolet absorbers [e.g., Tinuvin 320, Tinuvin 326, Tinuvin 328 (trade names for ultraviolet absorbers of Ciba-Geigy)] in addition to the above titanium dioxide pigment, fluorescent agent, color pigment or color dye, metal salt of fatty acid and antioxidant.

The photographic support of this invention is produced by a so-called extrusion coating method, in which the molten polyolefin resin is casted on the running substrate such as paper, synthetic paper or a film to coat usually both sides of the substrate with the resin. In order to form a resin layer having a multilayer structure, preferably used is a so-called tandem extrusion system, in which the inner resin layer and the outermost resin layer on the right side of the photographic support are successively, preferably continuously, formed by extrusion coating or so-called coextrusion coating system in which the outermost resin layer and the inner resin layer are simultaneously formed by extrusion coating. Before the substrate is coated with the polyolefin resin, the substrate is preferably subjected to an activating treatment such as a corona discharge treatment, a flame treatment or the like. The emulsion-layer side of the photographic support has a glossy surface, a finely roughened or matte surface to such an extent that it does not affect the gloss of the surface of the photographic paper obtained therefrom disclosed in Japanese Patent Application Kokai No. 55-26507 a silky surface or the like. Usually, the back side of the photographic support has a dull surface. The right side or, if necessary, both sides of the photographic support may be subjected to an activating treatment such as a corona discharge treatment, a flame treatment or the like. The photograpic support may be further subjected to an undercoating treatment as disclosed in Japanese Patent Application Kokai No. 61-84643 after the activating treatment. The thickness of the resin layer on the right or back side is not critical; however, in general, it is preferably 10–50 μm.

The substrate used in this invention includes a natural pulp paper mainly composed of a natural pulp; a synthetic fiber-containing paper composed of natural pulp and a synthetic fiber; a synthetic fiber paper mainly composed of a synthetic fiber; a so-called synthetic paper produced by making a film composed of a synthetic resin such as polystyrene, polypropylene or the like into a paper form; and a film composed of cellulose acetate, poly(ethylene terephthalate), a polycarbonate or the like. As the substrate for a polyolefin resin-coated paper, the natural pulp paper (hereinafter reffered to as the base paper) is advantageously used in view of the objects of this invention of providing economically a photographic support excellent in that high sharpness of the printed image can be obtained, the microgrit or die lip strings does not substantially appears, and hence, has excellent surface property.

As a pulp composing the base paper used in this invention, advantageously used is a natural pulp appropriately selected as disclosed in Japanese Patent Application Kokai Nos. 58-37642, 60-67490, 60-69649, 61-35442 and the like. However, if necessary synthetic pulp or synthetic fiber may be used along with the natural pulp. As the natural pulp, preferably used is a wood pulp such as softwood pulp, hardwood pulp or a mixture thereof, which has been subjected to usual bleaching with chlorine, hypochloride, chlorine dioxide or the like; alkali extraction or alkali treatment; oxidation bleaching with hydrogenperoxide, oxygen or the like; or a combination of these treatments. Moreover, various pulps may be used such as kraft pulp, sulfite pulp, soda pulp and the like.

Into the base paper used in this invention may be incorporated various sizing agents, high molecular weight compounds or additives in the preparation of a paper slurry.

The sizing agents for the base paper preferably used in this invention include metal salts of fatty acids, fatty acids, alkylketene dimers, alkenyl- or alkylsuccinic anhydrides, epoxized amides of higher fatty acids as disclosed in Japanese Patent Application Kokai No. 54-147211 and organic fluoro compounds as disclosed in Japanese Patent Application Kokai No. 56-109343.

The sizing agent suitable for the base paper used in this invention includes metal salts of fatty acids and fatty acids in such a form that they can be fixed to pulp using a water-soluble aluminum salt such as aluminum chloride, sulfite alumina, poly(aluminum chloride) or the like; alkylketene dimers in such a form that they can be fixed with or without the water-soluble aluminum salt and a combination of the alkylketene dimer and an epoxized amide of a higher fatty acid. The metal salts of higher fatty acids and the fatty acids are preferably those having 12–22 carbon atoms and they are preferably added in an amount of 0.5–4.0% by weight based on the bone-dry weight of the pulp. The proportion of the solid weight of the water-soluble aluminum salt optionally added to the weight of the sizing agent is preferably 1/20–4/1, more preferably 1/10–1/1. The alkyl group of the alkylketene dimers has preferably 8–30 carbon atoms, more preferably 12–18 carbon atoms. Usually, alkylketene dimers are on the market in the form of the emulsion, and a specific example is Aquapel 360XC (a trade name of Dic Hercules Chemicals. Inc.). They are added preferably in an amount of 0.2–4.0% by weight based on the bone-dry weight of the pulp.

The high molecular weight compound advantageously added to the base paper used in this invention in preparing a paper slurry includes a cationic wet-strength-reinforcing agent or a cationic, anionic or amphoteric strength-reinforcing agent. The cationic wet-strength-reinforcing agent is preferably polyamine-polyamideepichlorohydrin resin and it is added in an amount of preferably 0.05–4.0% by weight, more preferably 0.15–1.5% by weight, based on the dry weight of the pulp. Specific examples of the cationic wet-strength-reinforcing agent are kymene 557H, kymene S-25, Epinox P-130 (these are trade names of Dic Hercules Chemicals. Inc.) and the like.

The cationic, anionic and amphoteric strength-reinforcing agents include cationized starch as disclosed in Japanese Patent Application Kokoku 60-17103; cationic poly(vinyl alcohol) as disclosed in Japanese Patent Application No. 62-49699; cationic polyacrylamide as disclosed in Japanese Patent Application Kokai Nos. 57-185432 and 57-197539; anionic polyacrylamide as disclosed in Japanese Patent Application Kokoku Nos. 62-23119 and 62-31118; amphoteric polyacrylamide as disclosed in Japanese Patent Application Kokoku No. 61-37613 and Japanese Patent Application Kokai No. 59-31949; vegetable galactomannan as disclosed in Japanese Patent Application Kokai No. 59-125731; and the like. They are added in an amount of preferably 0.05–8% by weight, more preferably 0.15–4% by weight, based on the dry weight of the pulp.

To the base paper used in this invention may be added various additives in the preparation of the paper slurry. There may be added, in proper combination a filler such as clay, kaolin, potassium carbonate, barium sulfate, magnesium silicate, titanium dioxide or the like; a pH modifier such as sodium hydroxide, sodium carboante or the like; a coloring pigment, a coloring dye or a fluorescent whitening agent as disclosed in Japanese Patent Application Kokai No. 54-147033 and Japanese Patent Application Nos. 62-37555 and 63-96516.

To the base paper used in this invention may be added various water-soluble polymers, antistatic agents, latices, emulsions, pigments, pH modifiers and the like by spraying or tab size pressing. The water-soluble polymer includes starchy polymers as disclosed in Japanese Patent Application No. 63-96516, poly(vinyl alcohol)-type polymers, gelatinic polymers, polyacrylamide-type polymers, cellulosic polymers and the like. The antistatic agent includes alkali metal salts such as sodium chloride, potassium chloride and the like; alkaline earth metal salts such as calcium chloride, barium chloride and the like; colloidal metal oxides such as colloidal silica and the like; organic antistatic agents as disclosed in Japanese Patent Application Kokai No. 58-82242; and the like. The latices and emulsions include petroleum resin emulsion and latices of styrene/acrylic acid/acrylic acid ester terpolymer, styrene/acrylic acid/butadiene terpolymer, ethylene/vinyl alchol copolymer, styrene/maleic acid/acrylic acid ester terpolymer and the like. The pigment includes clay, kaolin, talc, barium sulfate, titanium dioxide and the like. The pH modifier includes hydrochloric acid, phosphoric acid, citric acid, sodium hydroxide, sodium carbonate and the like. These additives are advantageously used in appropriate combination with the coloring pigment, coloring dye or fluorescent agent mentioned above.

In order to make the base paper used in invention, there may be used a conventionally used paper machine such as Fourdrinier machine, a cylinder machine or the like; however, it is advantageous to adopt an appropriate method for making paper as disclosed in Japanese Patent Application Kokai Nos. 58-37642, 61-260240 and 61-284762. Though the thickness of the base paper is not critical, the base paper is preferably treated by an calender after the base paper is made as shown in Japanese Patent Application Kokai Nos. 58-37642 and 60-126397. The basis weight of the base paper is preferably 40–250 $g/m^2$.

For the purpose of the prevention of electrification, curling or the like, various backcoats layers may additionally be applied to the photographic support of this invention. The backcoat layers may contain in appropriate combination an inorganic anti-statistic agent, an organic antistatistic agent, a hydrophilic binder, a latex, a hardening agent a pigment, a surfactant and the like as disclosed in Japanese Patent Application Kokoku Nos. 52-18020, 57-9059, 57-53940, 58-56859; Japanese Patent Application Kokai Nos. 59-214849 and 58-184144; and the like.

After various photograph-constituting layers are formed by coating, the photographic support obtained in this invention can be applied to various uses such as a color photographic paper, a monochromic photographic paper, a phototype-setting photographic paper, a copy photographic paper, a reversal photographic material, a negative and positive photographic material for silver salt dispersion transfer, a printing material and the like. The photographic support may have an emulsion layer containing silver chloride, silver bromide, silver chlorobromide, silver iodobromide, silver chloroiodobromide or the like. The photographic emulsion layer containing a silver halide may contain a color coupler to form a silver halide constituting layer having a multilayer structure. The emulsion layer may contain a physycal developing nucleus to form a receiving layer for silver salt dispersion transfer. As a binder of these photographic-containing layers, there may be used a hydrophilic polymer such as poly(vinyl pyrrolidone), poly(vinyl alcohol), a sulfuric acid ester of a polysaccharide or the like in addition to a conventional gelatin. The photographic-constituting layer may contain various additives. For example, there may be contained, in appropriate combination, an optical sensitizing dye such as a cyanine dye, a merocyanine dye or the like; a chemical sensitizer such as a water-soluble gold compound, a sulfur compound or the like; an antifoggant or a stabilizer such as a hydroxy-triazolopyrimidine compound, a mercaptoheterocyclic compound or the like; a hardening agent such as formaldehyde, a vinylsulfone compound, an aziridine compound or the like; an auxiliary agent for coating such as a salt of benzenesulfonic acid, a salt of sulfosuccinic acid or the like; an anti-contaminant such as a dialkylhydroquinone compound or the like; other components such as a fluorescent whitening agent, a dye for improving the sharpness, an antistatic agent, a pH modifier, a fogging agent, or a water-soluble iridium or rhodium compound in the production or dispersion of a silver halide.

The photographic material containing a silver halide obtained from the photographic support of this invention is subjected to treatments such as exposure, development, termination, fixing, bleach,, stabilization and the like as shown in "Photosensitive Materials for Photography and Handling Thereof" by Goro Miyamoto, published by Kyoritsu Shuppan Co., Ltd., Photographic Techniques Course Vol. 2, depending upon the photographic material thereof. Especially, the multilayer silver halide photographic material which is applied to a single bath bleaching-fixing treatment after the coloring development may also be applied to a treatment with a color development solution of any main ingredient such as CD-III, CD-IV (these two compounds are products of Kodak Co., Ltd.), Droxychrom (a trade name of May & Bayker Co., Ltd.) or the like. The development solution comprising the main ingredient may contain a development accelerator such as benzyl alcohol, a thallium salt, phenidone or the like. However, the photographic material may also be treated with a development solution which contains substantially no benzyl alcohol. A useful one-bath bleaching-fixing solution is a solution of a metal salt of aminopolycarboxylic acid (e.g. a ferric salt of ethylene-diaminetetraacetic acid, propylenediaminetetraacetic acid, etc.). The useful fixing agent is sodium thiosulfate, ammonium thiosulfate or the like. The one-bath bleaching-fixing solution may contain various additives. For example, there may be contained in combination of desilver accelerator (e.g. mercaptocarboxylic acid as disclosed in U.S. Pat. No. 3,512,979, a mercaptoheterocyclic compound as disclosed in Belgian Patent No. 682,426, etc.), an anti-contaminant, a pH modifier, a pH buffer, a hardening agent (e.g. magnesium sulfate, aluminum sulfate, potassium alum, etc.), a surfactant and the like. The one-batch bleaching-fixing solution may be used at various pH values though the useful pH range 6.0–8.0.

Next, the second invention will be explained.

In the second invention, the titanium dioxide pigment may have rutile structure, anatase structure cr mixed crystal structure composition rutile structure anatase structure. Furthermore, titanium dioxide pigments having any of these structures may be used in combination. In order to obtain photographic support which can provide printed image of especially high sharpness, the titanium dioxide pigment preferably has rutile structure, the titanium dioxide pigment is produced by methods such as sulfuric acid method and chlorine method.

In the second invention, titanium dioxide pigment has a number-average diameter of 0.110–0.150 μm. The "number-average diameter" used in this invention means number-average value calculated from particle diameter obtained by measuring diameter of 1000 titanium dioxide pigment particles in a certain direction by an electron microscope. If the number-average diameter is less than 0.110 μm, much die lip stain occurs when polyolefin resin composition containing the titanium dioxide pigment is coated on a substrate and besides, printed image having a sufficient sharpness cannot be obtained. If it is more than 0.150 μm, also printed image of sufficient sharpness cannot be obtained. Titanium dioxide pigment used in the second invention preferably has a number-average diameter of 0.115–0.135 μm in order that die lip stain occurs little in production of photographic support and printed image of high sharpness can be obtained. The titanium dioxide pigment of 0.110–0.150 μm in number-average diameter can be produced under predetermined production conditions. That is, production conditions for obtaining the titanium dioxide pigment, especially, calcination conditions such as calcination temperature, calcination time, and mid and amount of inorganic compounds to be present in calcination (for example, various inorganic compounds disclosed in Japanese Patent Application Kokoku No. 48-18718 or combination thereof) can be determined by measuring number-average diameter of titanium dioxide pigment produced under a series of combination of test conditions. In this case, representative calcination conditions under which number-average diameter increases are higher calcination temperature, longer calcination time and smaller amount of inorganic compounds to be present in calcination and representative conditions under which number-average diameter decreases are lower calcination temperature, shorter calcination time and larger amount of inorganic compounds to be present in calcination. Especially preferred calcination conditions for titanium dioxide pigment used in the second invention are combined conditions of 800°–1100° C. in calcination temperature, 15 minutes —5 hours in calcination time and 0.2–5% by weight in amount of inorganic compound to be present in terms of inorganic oxide and based on the weight of titanium dioxide.

In the second invention, the titanium dioxide pigment is (1) one which has been subjected to a surface treatment with an aluminum-containing hydrated metal oxide to be coated with an aluminum-containing metal composition in an amount of more than 0.2% by weight, but less than 1.8% by weight in terms of anhydrous metal oxide based on the weight of the titanium dioxide pigment and with a silicon composition in an amount of 0–0.4% by weight in terms of anhydrous silicon dioxide based on the weight of the titanium dioxide pigment and/or (2) one which has been subjected to an inside treatment with an aluminum compound to contain, in the titanium dioxide pigment, an aluminum composition in an amount of more than 0.2% by weight, but less than 1.8% by weight in terms of anhydrous aluminum oxide based on the weight of the titanium dioxide pigment. The titanium dioxide may be subjected to both the surface treatment and the inside treatment. When the titanium dioxide pigment is produced by sulfuric acid method, it is preferably subjected to a surface treatment with a specific amount of aluminum-containing hydrated metal oxide in view of designing of titanium dioxide pigment.

The surface-treated titanium dioxide pigment used in the second invention is produced by wet grinding and classifying titanium dioxide and then subjecting it to surface treatment with an aluminum-containing hydrated metal oxide to coat the surface of the titanium dioxide with an aluminum-containing metal composition in an amount of more than 0.2% by weight in terms of anhydrous metal oxide based on the weight of the titanium dioxide pigment and with a silicon composition in an amount of 0–0.4% by weight in terms of anhydrous silicon dioxide based on the weight of the titanium dioxide pigment. If amount of the metal composition is 0.2% by weight or less, resin layer of resin-coated paper type photographic support containing the titanium dioxide pigment is inferior in weathering resistance. On the other hand, if it is 1.8% by weight or more, die lip stain occurs much. The amount of metal composition is preferably 0.35–1.5% by weight, more preferably 0.5–1.0% by weight in terms of anhydrous metal oxide based on the weight of the titanium oxide pigment. The aluminum-containing hydrated metal oxide is preferably hydrated aluminum oxide. Amount of the silicon composition is 0–0.4% by weight, preferably 0–0.2% by weight in terms of anhydrous silicon dioxide. Furthermore, other hydrated metal oxides such as hydrated titanium oxide and the like may also be used so as to coat the surface of titanium dioxide with other metal components such as titanium and the like in a total amount of 0–1.8% by weight in terms of anhydrous metal oxide. Alternatively, the surface treatment may be carried out with hydrated aluminum silicon oxide to coat the titanium dioxide pigment with silicon component in an amount of 0–0.4% by weight in terms of anhydrous silicon dioxide.

The surface treatment of titanium dioxide can be carried out using the same materials and methods as referred to in the surface treatment of titanium dioxide in the first invention.

The inside-treated titanium dioxide pigment used in the second invention is produced by subjecting the titanium dioxide to inside treatment with an aluminum compound to contain therein an aluminum composition in an amount of more than 0.2% by weight, but less than 1.8% by weight in terms of aluminum oxide based on the weight of the titanium dioxide pigment. If amount of the aluminum composition is 0.2% by weight or less, resin layer of resin-coated paper containing the titanium dioxide pigment is inferior in weathering resistance. If it is 1.8% by weight or more, considerable die lip stain occurs and microgrit appears much. Preferred amount of the aluminum composition is 0.35–1.5% by weight in terms of aluminum oxide based on the weight of titanium dioxide pigment.

The inside treatment of titanium dioxide can be carried out using the same materials and methods as referred to in the inside treatment of titanium dioxide in the first invention.

If necessary, the titanium dioxide pigment used in the second invention may be subjected to treatment with various organic materials such as triethanolamine, trimethylolpropane, metal salts of fatty acids, and organopolysiloxanes.

As methods, apparatuses and materials used for producing the titanium dioxide pigment used in the second invention, there may be used those which are used for producing titanium dioxide pigment used in the first invention.

As polyolefin resin and polyolefin resins constituting the polyolefin resin mixture used in the second invention, mention may be made of, for example, homopolymers such as polyethylene, polypropylene, polybutene and polypentene and copolymers comprising two or more α-olefins such as ethylene-propylene copolymer and ethylene-butylene copolymer. From the points of economy and melt-extrusion coatability, preferred are polyethylene resins such as low-density polyethylene; medium-density polyethylene; high-density polyethylene; straight chain low-density polyethylene; copolymers of ethylene with α-olefin such as propylene or butylene; and carboxy-modified polyethylene. The polyolefin resin and polyolefin resins constituting the polyolefin resin mixture may have various densities, MI, molecular weights and molecular weight distributions, but normally, density is preferably 0.90–0.97 g/cm$^3$, MI is preferably 1–30, more preferably 3–15, and molecular weight is preferably 20,000–250,000. These polyolefin resins may be used singly or as mixtures. In case of the resin layer being of multi-layer structure, resins of different properties may be used, for example, a resin having an MI of 5–10 is used for outer layer and a resin having an MI of 2–10 is used for inner layer.

The titanium dioxide pigment used in the second invention can be contained in resin layer by the methods mentioned for containing titanium dioxide in resin layer in the first invention.

As fluorescent agents used in the second invention and methods for containing the fluorescent agents in resin layer, there may be used those which are used in the first invention.

As color pigments and color dyes used in the second invention, there may be used optional ones, but preferred are inorganic or organic blue pigments or blue dyes and inorganic or organic magenta pigments or magenta dyes. Examples of the inorganic blue pigments and dyes include cobalt blue, Prussian blue and ultramarine and examples of organic blue pigments and dyes include cerulean blue, Phthalocyanine Blue and Chromophthal Blue A3R. Examples of inorganic magenta pigments and dyes include cobalt violet and fast violet. Examples of organic magenta pigments and dyes include quinacridone red. Amount of the inorganic blue pigments or dyes to be added to resin layer is preferably 0.025–0.5% by weight, more preferably 0.05–0.2% by weight based on the weight of resin layer. Amount of organic blue pigments and dyes is preferably 0.001–0.1% by weight, more preferably 0.0025–0.05% by weight. Amount of inorganic magenta pigments and dyes is preferably 0.025–1.0% by weight, more preferably 0.05–0.4% by weight based on the weight of resin layer. Amount of organic magenta pigments and dyes is preferably 0.001–0.03% by eight, more preferably 0.002–0.015% by weight bused on the weight of resin layer. If the amount is too small, sufficient coloring effect cannot be obtained and if it is too large, not only brightness decreases, but also die lip stain is very conspicuous.

It is preferred to contain an antioxidant in resin layer of resin-coated paper type photographic support of the second invention in order to more effectively prevent die lip stain in production of resin-coated paper. The same antioxidants and methods for containing the antioxidants as used in the first invention may also be used in the second invention.

In the second invention, the resin layer preferably further contains the metal salts of fatty acids as mentioned in the first invention.

In the second invention, the resin layer contains polyolefin resin, titanium dioxide pigment, fluorescent agent and color pigment or color dye and preferably further contains metal salt of fatty acid and antioxidant. In case of the resin layer having a multi-layer structure, optional layer may contain the titanium dioxide pigment, the fluorescent agent, the coloring pigment or dye, the metal salt of fatty acid and the antioxidant. Furthermore, in the second invention, the resin layer provided on the image-forming side and, if necessary, the resin layer provided on back side may contain various additives in proper combination in addition to the above-mentioned titanium dioxide pigment, fluorescent agent, coloring pigment or coloring dye, metal salt of fatty acid and antioxidant.

The photographic support of the second invention can be produced by providing resin layer on a substrate by the method mentioned in the first invention.

The substrates used in the first invention may also be used in the second invention.

Besides, pulps which constitute paper used as substrate, sizing agents, polymer compounds and various additives as used in the first invention may also be used in the second invention. Paper can also be made in the same manner as in the first invention.

Back coat layer and various photographic layers can be provided on photographic support in the same manner as in the first invention and thus photographic materials can be obtained. The resulting photographic support is applicable to various uses as mentioned in the first invention.

Next, the third invention will be explained.

The titanium dioxide pigment used in the third invention has a number-average diameter (as defined in the second invention) of 0.110–0.150 μm and carries on the surface at least one compound selected from the group consisting of magnesium compound, calcium compound and barium compound in an amount of 0.004–0.1% by weight in terms of metal based on the weight of the titanium dioxide pigment.

In the third invention, titanium dioxide pigment may have rutile structure, anatase structure or mixed crystal structure comprising rutile structure and anatase structure. Furthermore, titanium dioxide pigments having these structures may be used in combination, but in order to obtain photographic support which can provide printed image especially high in sharpness, the titanium dioxide pigment preferably has rutile structure.

If number-average diameter of titanium dioxide is less than 0.110 μm, die lip stain occurs much when polyolefin resin composition containing the titanium dioxide is coated on a substrate and besides, printed image having sufficient sharpness cannot be obtained. If number-average diameter is more than 0.150 μm, printed image having sufficient sharpness cannot be also obtained. The titanium dioxide pigment used in the third invention preferably has a number-average diameter of 0.115–0.135 μm in order that die lip stain occurs little in production of photographic support and that printed image of high sharpness can be obtained. Titanium dioxide pigment having a number-average diameter of 0.110–0.150 μm can be produced under the same conditions as mentioned in the second invention.

The titanium dioxide pigment used in the third invention is produced by supporting on the surface at least one compound selected from the group consisting of magnesium compound, calcium compound and barium compound in an amount of 0.004–0.1% by weight in terms of metal based on the titanium dioxide pigment. If amount of the compound supported on the surface of titanium dioxide pigment is less than 0.004% by weight, much die lip stain occurs when polyolefin resin composition containing the titanium dioxide pigment is coated on a substrate and besides, printed image having high sharpness cannot be obtained. On the other hand, if the amount of the compound is more than 0.1% by weight, also much die lip stain occurs when polyolefin resin composition containing the titanium dioxide pigment is coated on a substrate and besides, printed image of high sharpness cannot be obtained. The amount of the compound supported on the surface of titanium dioxide pigment is preferably 0.006–0.07% by weight in terms of metal based on the weight of titanium dioxide. Calcium compounds, magnesium compounds and barium compounds supported on the surface of titanium dioxide are preferably water-soluble salts, but may be oxides or hydroxides. Examples of the calcium compounds include calcium chloride, calcium hydroxide, calcium oxide, calcium acetate, calcium citrate and calcium carbonate. Examples of the magnesium compounds include magnesium chloride, magnesium sulfate, magnesium hydroxide, magnesium oxide, magnesium acetate, magnesium citrate, and magnesium carbonate. Examples of the barium compounds include barium chloride, barium hydroxide and barium oxide.

Supporting of calcium compound, magnesium compound, or barium compound on the surface of titanium dioxide can be carried out by adding the compound to titanium dioxide slurry at an optional stage in the step of making titanium dioxide slurry by suspending ground product of titanium dioxide clinker and the subsequent steps in the course of production of titanium dioxide pigment. Preferably, aqueous solution or suspension of the compound is added to titanium dioxide slurry at optional stage at or after wet grinding.classification step to adsorb the compound onto the surface of titanium dioxide.

As a result of the investigation conducted by the inventors, it has been found that amount of the magnesium compound, calcium compound or barium compound supported on the surface of titanium dioxide depends on various factors, e.g. kind of the compound, amount of the compound added and step at which the compound is added; properties of titanium dioxide particles such as particle diameter, specific surface area, crystal form and crystal structure; kind and amount of hydrated metal oxide with which the surface of titanium dioxide pigment is treated; and conditions of titanium dioxide slurry such as pH, temperature and concentration. Therefore, specific production conditions, especially kind and addition amount of the magnesium compound, calcium compound and barium compound can be determined by evaluating properties of polyolefin resin-coated paper type photographic supports produced by containing the pigment in resin layer which is produced under a series of combination of test conditions.

Amount of the compound supported on the surface of titanium dioxide pigment is usually considerably smaller than the amount of the compound which has been added to titanium dioxide slurry. Specifically, amount of the magnesium compound, calcium compound or barium compound which has been supported on the surface of titanium dioxide can be obtained by analysis conducted in the following manner.

1.0000 g of accurately weighed titanium dioxide pigment is put in a crucible and thereto is added 10 ml of 36 wt % hydrochloric acid solution of special grade. The crucible is closed and heated at 360° C. ±20° C. for 15 minutes on a sand bath and cooled and then filtrated (if separation by the filtration is insufficient, centrifugal separation is also carried out in combination). The filtrate is washed with 10 ml of dilute hydrochloric acid obtained by diluting special grade 36 wt % hydrochloric acid solution with 490 ml of distilled water and to the resulting filtrate is added 3 ml of a 3 wt % solution of special grade $SrCl_2.6H_2O$ in distilled water and total amount is adjusted to 100 ml with distilled water to obtain a test liquid. This test liquid is subjected to atomic absorption spectrometry and concentration of calcium, magnesium or barium in the test liquid by previously obtained calibration curve and thus amount of the compound supported on the surface of titanium dioxide pigment is calculated.

The titanium dioxide pigment used in the third invention is preferably that which has been subjected to a surface treatment with a specific amount of hydrated metal oxide containing at least aluminum or to an inside treatment with a specific amount of an aluminum compound and in addition, it may be subjected to both the surface treatment and the inside treatment. Especially, when the titanium dioxide pigment is produced by sulfuric acid method, the titanium dioxide pigment is preferably subjected to the surface treatment with a specific amount of aluminum-containing hydrated metal oxide from the point of designing of titanium dioxide pigment.

The surface-treated titanium dioxide pigment used preferably in the third invention is produced by subjecting titanium dioxide after wet ground and classified to a surface treatment with an aluminum-containing hydrated metal oxide to coat the surface of the titanium dioxide pigment with an aluminum-containing metal composition in an amount of more than 0.2% by weight, but less than 1.8% by weight in terms of anhydrous metal oxide based on the weight of the titanium dioxide pigment and with a silicon composition in an amount of 0–0.4% by weight in terms of anhydrous silicon dioxide. If amount of the metal composition is 0.2% by weight or less, resin layer of resin-coated paper type photographic support containing the titanium dioxide pigment is inferior in weathering resistance. If it is 1.8% by weight or more, die lip stain occurs much. The amount of the metal composition is preferably 0.35–1.5% by weight, more preferably 0.5–1.0% by weight in terms of anhydrous metal oxide based on the weight of the titanium dioxide pigment. The aluminum-containing hydrated metal oxide is preferably hydrated aluminum oxide. The amount of the silicon composition is 0–0.4% by weight, preferably 0–0.2% by weight in terms of anhydrous silicon dioxide. Other hydrated metal oxides such as hydrated titanium oxide can be used so as to coat with other metal components such as titanium in a total amount of 0–1.8% by weight in terms of anhydrous metal oxide. Further, the surface treatment can be carried out with a hydrated aluminum silicon oxide so as to coat with a silicon component in an amount of 0–0.4% by weight in terms of anhydrous silicon dioxide.

The materials and methods used for surface treatment in the first invention can be used for surface treatment of titanium dioxide in the third invention.

Further, the inside-treated titanium dioxide pigment used preferably in the third invention can be produced by subjecting titanium dioxide pigment to inside-treatment with an aluminum compound to contain therein an aluminum composition in an amount of more than 0.2% by weight, but less than 1.8% by weight in terms of aluminum oxide based on the weight of the titanium dioxide pigment. If amount of the aluminum composition is 0.2% by weight or less, weathering resistance of resin layer of resin-coated paper containing the titanium dioxide pigment is deteriorated. If it is 1.8% by weight or more, die lip stain occurs much and besides much microgrit appears. Preferred amount of the aluminum composition is 0.35–1.5% by weight in terms of aluminum oxide based on the weight of the titanium dioxide pigment.

The materials and methods used for inside treatment of titanium dioxide in the first invention can be used in the inside treatment in the third invention.

If necessary, the titanium dioxide pigment used in the third invention may be subjected to treatment with organic materials such as triethanolamine, trimethylolpropane, metal salts of fatty acids, and organopolysiloxane.

The methods, apparatuses and materials mentioned in the first invention for production of titanium dioxide pigment in the first invention can be used as methods, apparatuses and materials for production of titanium dioxide pigment in the third invention.

As polyolefin resins used in the third invention, there may be used those which are used in the first invention.

In the third invention, there may be used the methods for containing titanium dioxide pigment in resin layer which are used in the second invention.

As antioxidants and methods for containing them in resin layer used in the third invention, there may be used those which are referred to in the first invention.

The metal salts of fatty acids referred to in the first invention can also be contained in resin layer in the third invention.

The resin layer in the third invention preferably contains a fluorescent agent in order to reduce yellowing caused by titanium dioxide pigment to improve whiteness. Various fluorescent agents such as those of naphthalene type, stilbene type, thiophene type and coumarin type may be used, but considering improvement of whiteness, dispersibility in polyolefin resin, heat resistance, anti-bleeding out, weathering resistance and stability in photographic processing solution, bis(benzoxazolyl)naphthalene fluorescent agents having substituent and/or bis(benzoxazolyl)stilbene fluorescent agents having substituent are preferred. Specifically, there may be used the fluorescent agents and methods for containing the fluorescent agents in resin layer as mentioned in the first invention.

Resin layer may further contain reagents as mentioned in the first invention such as inorganic or organic blue pigments or blue dyes; inorganic or organic magenta pigments or magenta dyes; and various additives.

The photographic support of the third invention can be produced by providing resin layer on a substrate by the method as mentioned in the first invention.

As the substrates used in the third invention, there may be used those which are referred to as substrates in the first invention.

Furthermore, pulse which constitute paper used as substrate, sizing agents, polymer compounds, and various additives as mentioned in the first invention may also be used in the third invention. Making of paper may also be carried out in the same manner as in the first invention.

Formation of backcoat layer and various photographic layers on the photographic support may also be carried out in the same manner as in the first invention and thus photographic materials are obtained. The resulting photographic materials can be applied to various uses as mentioned in the first invention.

DESCRIPTION OF PREFERRED EMBODIMENTS OF THE INVENTION

This invention is explained in more detail by the following examples.

EXAMPLES 1-2 AND COMPARATIVE EXAMPLES 1-11

Rutile type titanium dioxide clinker produced in accordance with the production procedure of rutile type titanium dioxide pigment by sulfuric acid method was subjected to grinding and dressing and further subjected to wet grinding and classification to obtain titanium dioxide slurry containing substantially no coarse particles. This slurry was put in a reaction tank and pH of the slurry was raised to about 9.2 with sodium hydroxide. Then, this slurry was heated to about 70° C. and thereafter, thereto was added an aqueous sodium aluminate-solution in an amount of 0.15% by weight, 0.75% by weight or 1.6% by weight in terms of $Al_2O_3$ based on the dry weight of the titanium dioxide and the mixture was left to stand for 30 minutes.

pH of the slurry was lowered to 7.0 by addition of 20% sulfuric acid and the slurry was aged for 2 hours. Thereafter, the original liquid of titanium dioxide slurry surface treated with hydrated alumina was filtrated by a filter press and successively, titanium dioxide cake in the filter press was washed with running water under predetermined conditions until the suspension electric conductivity defined hereabove reached 45 μV/cm.

Then, the titanium dioxide cake was dried and impact ground in a hammer mill having a quantitative feeder and further subjected to finishing grinding to produce rutile type titanium dioxide pigments the surface of which was treated with different amounts of hydrated alumina.

50 parts by weight of low-density polyethylene having a density of 0.918 g/cm$^3$ and an MFR of 8.0 g/10 min or 3.5 g/10 min, 50 parts by weight of the titanium dioxide pigment obtained above or commercially available anatase type titanium dioxide pigment and 2.5 parts by weight of zinc stearate were well kneaded at 150° C. by a Banbury mixer to prepare a masterbatch of titanium dioxide pigment.

Separately, 50 parts by weight of the same low-density polyethylene as used for preparation of the above titanium dioxide pigment masterbatch, 50 parts by weight of the above titanium dioxide or commercially available anatase type titanium dioxide pigment, 1.25 part by weight of ultramarine (#2000, manufactured by Daiichi Kasei Kogyo Co.) and 2.5 parts by weight of zinc stearate were well kneaded at 150° C. by a Banbury mixer to prepare a titanium dioxide pigment masterbatch containing ultramarine.

Furthermore, 0.28 part by weight of fluorescent agent [IX] mentioned hereinbefore and 0.28 part by weight of zinc stearate were previously well mixed and the resulting mixture was well kneaded with 40 parts by weight of the same low-density polyethylene as used for preparation of the above titanium dioxide pigment masterbatch in a Laboplast mill at 135° C. to prepare a fluorescent agent masterbatch.

On the other hand, a mixture of 50 parts by weight of bleached hardwood kraft pulp and 50 parts by weight of bleached softwood sulfite pulp was beaten to a Canadian standard freeness of 310 ml. To 100 parts by weight of this pulp were added 3 parts by weight of cationized starch, 0.2 part by weight of anionized polyacrylamide, 0.4 part by weight of an alkyl ketene dimer emulsion (as ketene dimer content) and 0.4 part by weight of polyamine-polyamide-epichlorohydrin resin and a paper of 160 g/m$^2$ in basis weight was made from he mixture. The resulting wet paper was dried at 110° C. and successively impregnated with an impregnation solution consisting of 3 parts by weight of a carboxy-modified polyvinyl alcohol, 0.05 part by weight of a fluorescent brightener, 0.002 part by weight of a blue dye, 0.2 part by weight of citric acid and 97 parts by weight of water at a coverage of 25 g/m$^2$. Then, this paper was dried by hot air of 110° C. and supercalendered at a linear pressure of 90 kg/cm. Then, both sides of the paper were subjected to corona discharge treatment to obtain a paper substrate for resin-coated paper for photograph.

On the back side of the paper substrate was coated a mixture (1:1 in weight ratio) of a high-density polyethylene (density: 0.960 g/cm$^3$, MFR=5 g/10 min) and a low-density polyethylene (density: 0.923 g/cm$^3$, MFR=5 g/10 min) at a thickness of 30 μ at a resin temperature of 330° C. using a melt extrusion coater. Then, a resin composition composed of the titanium dioxide pigment masterbatch obtained above, the titanium dioxide pigment masterbatch containing ultramarine obtained above and the fluorescent agent masterbatch obtained above, and a high-density polyethylene (density: 0.970 g/cm$^3$, MFR as shown in Table 1) and a low-density polyethylene (density: 0.920 g/cm$^3$, MFR as shown in Table 1) as diluent resins at the mixing ratio as shown in Table 1 was melt extrusion coated on the right side of the above paper substrate at a thickness of 30 μ at a resin temperature of 330° C. to make polyethylene resin-coated papers of this invention and comparative polyethylene resin coated papers. The right side coated with polyethylene containing titanium dioxide pigment was finished to completely smooth glossy surface and the back side coated with polyethylene was finished to matte surface such as that of paper.

Apparent whiteness of the side containing titanium dioxide pigment of the thus obtained polyethylene resin-coated paper type photographic support was visually evaluated. Criteria for evaluation are as follows.

"◎" Extremely white

"○" Considerably white

"(Δ)" White

"Δ" Slightly yellow

"X" Yellow

Light resistance of the photographic support was evaluated in the following manner.

Optical density of the right side after subjected to irradiation for 120 hours by a fadometer (FAL-25X-HCL manufactured by Suga Tester Co.) was measured by a densitometer (TD-504 manufactured by Macbeth Co.). The greater value of optical density indicates that degree of yellowing is great and light deterioration is conspicuous (inferior in light resistance).

Furthermore, die lip stain was measured as follows:

Using a screw type extrusion machine having an extruder bore of 65 mm and a melt extrusion machine having a 750 mm-wide T-die, melt extrusion was carried out at a resin temperature of 320° C. and a screw rotation speed of 100 rpm for 2 hours. The number of stains formed on the lip die was counted.

In order to measure sharpness of printed image, a color photographic paper comprising the above obtained resin-coated paper as a support was prepared as follows: First, the back side of the resin-coated paper was subjected to corona discharge treatment and was coated with a backcoat layer comprising a composition of colloidal silica: styrene acrylate latex=1:1 in a dry weight ratio at a coverage of 0.4 g/m$^2$. Then, resin surface of the right side of the resin-coated paper containing titanium dioxide pigment was subjected to corona discharge treatment and then provided with a blue-sensitive emulsion layer containing yellow-coloring coupler, an interlayer containing an anti-color mixing agent, a green-sensitive emulsion layer containing a magenta-color coupler, an ultraviolet absorbing layer containing ultraviolet absorber, a red-sensitive emulsion layer containing a cyan-coloring coupler, and a protective layer to obtain a color photographic paper. Each emulsion layer contained silver chlorobromide in an amount of 0.6 g/m$^2$ in terms of silver nitrate and in addition gelatin necessary for production and dispersion of silver halide and film-formation. The emulsion layers further contained suitable amounts of antifoggant, sensitizing dye, coating aid, hardener, thickener and filter dye.

A resolving power chart was brought into close contact with the photographic paper, followed by exposing to green light and color developing to obtain a test sheet. Image on this test sheet was subjected to measurement by a microdensitometer and contrast transfer function (hereinafter referred to as "CTF") was obtained as sharpness of the image in the green-sensitive layer using a personal computer according to ordinary method. Sharpness of printed image on resin-coated paper was evaluated thereby. The layer value of CTF means higher sharpness of printed image.

The results are shown in Table 2.

TABLE 1

| | Kind of titanium dioxide pigment | | Masterbatch | | | | | Diluent Resin | | | | |
|---|---|---|---|---|---|---|---|---|---|---|---|---|
| | | | | | | | | High-density polyethylene | | High-density polyethylene | | |
| | Crystal form of titanium dioxide | Coating amount of surface treating agent*3 (% by weight) | Amount of white master-batch*4 (part by weight) | Amount of blue master-batch*5 (part by weight) | Amount of fluorescent agent master-batch (part by weight) | Total amount of master-batch (part by weight) | MFR of base resin of master-batch (g/10 min) | Amount (part by weight) | MFR (g/10 min) | Amount (part by weight) | MFR (g/10 min) | Weighted-mean MFR of resin*6 (g/10 min) |
| Comparative Example 1 | Rutile type*1 | 0.15 | 18.8 | 7.2 | 3 | 29 | 8.0 | 20 | 7.0 | 51 | 6.0 | 6.78 |
| Comparative Example 2 | Rutile type*1 | 0.15 | 18.8 | 7.2 | 3 | 29 | 3.5 | 20 | 3.0 | 51 | 3.5 | 3.60 |
| Example 1 | Rutile type*1 | 0.75 | 18.8 | 7.2 | 3 | 29 | 8.0 | 20 | 7.0 | 51 | 6.0 | 6.78 |
| Example 2 | Rutile type*1 | 0.75 | 26.0 | 0 | 3 | 29 | 8.0 | 20 | 7.0 | 51 | 6.0 | 6.78 |
| Comparative Example 3 | Rutile type*1 | 0.75 | 18.8 | 7.2 | 3 | 29 | 3.5 | 20 | 4.0 | 51 | 3.5 | 3.60 |
| Comparative Example 4 | Rutile type*1 | 0.75 | 26.0 | 0 | 3 | 29 | 3.5 | 20 | 4.0 | 51 | 3.0 | 3.60 |
| Comparative Example 5 | Rutile type*1 | 0.75 | 18.8 | 7.2 | 0 | 26 | 8.0 | 20 | 7.0 | 51 | 6.0 | 6.72 |
| Comparative Example 6 | Rutile type*1 | 0.75 | 26.0 | 0 | 0 | 26 | 8.0 | 20 | 7.0 | 54 | 6.0 | 6.72 |
| Comparative Example 7 | Rutile type*1 | 0.75 | 28.8 | 7.2 | 0 | 26 | 3.5 | 20 | 4.0 | 54 | 3.5 | 3.60 |
| Comparative Example 8 | Rutile type*1 | 0.75 | 26.0 | 0 | 0 | 26 | 3.5 | 20 | 4.0 | 54 | 3.5 | 3.60 |
| Comparative Example 9 | Rutile type*1 | 1.60 | 18.8 | 7.2 | 3 | 29 | 8.0 | 20 | 7.0 | 51 | 6.0 | 6.78 |
| Comparative Example 10 | Rutile type*1 | 1.60 | 18.8 | 7.2 | 3 | 29 | 3.5 | 20 | 4.0 | 51 | 3.5 | 3.60 |
| Comparative Example 11 | Anatase type *2 | 1.55 | 18.8 | 7.2 | 0 | 26 | 8.0 | 20 | 7.0 | 54 | 6.0 | 6.72 |

*1 Rutile type titanium dioxide pigment produced by sulfuric acid method mentioned herebefore.
*2 Commercially available anatase type titanium dioxide pigment produced by sulfuric acid method.
*3 Amount of aluminum composition coated on the surface of titanium dioxide by surface treatment with hydrated alumina is shown by % by weight in terms of $Al_2O_3$ based on the dry weight of titanium dioxide.
*4 Amount of masterbatch of titanium dioxide pigment is shown in part by weight.
*5 Amount of masterbatch of titanium dioxide containing ultramarine is shown in part by weight.
*6 This is the same as that mentioned herebefore.

TABLE 2

| | Apparent whiteness | Total number of die lip stain *7 | CTF (sharpness of printed image) *8 | Light resistance (optical density) |
|---|---|---|---|---|
| Comparative Example 1 | ○ | 0 | 0.67 | 0.11 |
| Comparative Example 2 | ○ | 0 | 0.68 | 0.11 |
| Example 1 | ○ | 4 | 0.71 | 0.05 |
| Example 2 | (Δ) | 1 | 0.71 | 0.05 |
| Comparative Example 3 | ○ | 21 | 0.71 | 0.05 |
| Comparative Example 4 | (Δ) | 11 | 0.70 | 0.05 |
| Comparative Example 5 | Δ | 2 | 0.71 | 0.04 |
| Comparative Example 6 | × | 0 | 0.71 | 0.04 |
| Comparative Example 7 | Δ | 14 | 0.71 | 0.04 |
| Comparative Example 8 | × | 7 | 0.70 | 0.04 |
| Comparative Example 9 | ○ | 68 | 0.68 | 0.05 |
| Comparative Example 10 | ○ | 100 or more | 0.69 | 0.05 |
| Comparative Example 11 | (Δ) | 100 or more | 0.56 | 0.04 |

*7: Total number of die lip stain formed on the front and rear of the die lip.
*8: A value at a line density = 5/mm.

As is clear from Table 2, the resin-coated paper type photographic supports of the first invention which had on its image-forming side a resin layer comprising a rutile type titanium dioxide pigment the surface of which was coated with aluminum composition in an amount of more than 0.2% by weight, but less than 1.5% by weight in terms of $Al_2O_3$ based on the weight of the titanium dioxide, a substituent-containing bis(benzoxazolyl)stilbene fluorescent agent, and a polyolefin resin having a weighted-mean MFR of more than 4.0 g/10 min, but less than 9.5 g/10 min (Examples 1 and 2) were photographic supports which were high in sharpness of printed image, high in lightness and apparent whiteness and besides showed very little die lip stain at production of the photographic support and thus had good surface property.

On the other hand, the comparative photographic supports (Comparative Examples 1–11) had respective defects.

That is, when anatase type titanium dioxide pigment was used (Comparative Example 11), sharpness of printed image was low. Even if rutile type titanium dioxide pigment was used, when the surface thereof was coated with a metal composition in an amount of 0.2% by weight or less in terms of anhydrous metal oxide based on the weight of the titanium dioxide (Comparative Examples 1 and 2), light resistance was inferior. When titanium dioxide pigment the surface of which was coated with a metal composition in an amount of 1.5% by weight or more in terms of anhydrous metal oxide based on the weight of the titanium dioxide was used (Comparative Examples 9 and 10), much die lip stain occurred. When weighted-mean MFR of polyolefin resin was 4.0 g/10 min or less (Comparative Examples 3, 4, 7 and 8), also much die lip stain occurred. Further, when fluorescent agent was not contained (Comparative Examples 5–8), resin surface on the image forming side of the photographic support was yellowed.

EXAMPLES 3–10

Procedure of Example 1 was repeated except that a low-density polyethylene resin for masterbatch used in Example 1 to which was previously added tetrakis [methylene(3,5-di-tert-butyl-4-hydroxyhydrocinnamate)] methine in an amount as shown in Table 3 was used as low-density polyethylene resin for masterbatch.

The results are shown in Table 3.

TABLE 3

| | Amount of antioxidant *9 (ppm) | Apparent whiteness *10 | Total number of die lip stain *10 | CTF (sharpness of printed image) *10 |
|---|---|---|---|---|
| Example 3 | 0 | ○ | 4 | 0.70 |
| Example 4 | 10 | ○ | 2 | 0.71 |
| Example 5 | 20 | ○ | 0 | 0.71 |
| Example 6 | 150 | ○ | 0 | 0.70 |
| Example 7 | 300 | ○ | 0 | 0.71 |
| Example 8 | 500 | ○ | 1 | 0.69 |
| Example 9 | 1000 | ○ | 3 | 0.67 |
| Example 10 | 2000 | ○ | 7 | 0.67 |

*9: Amount (ppm) of antioxidant based on the weight of resin composition on the side containing titanium dioxide pigment.
*10: Same as in Table 2.

As can be seen from Table 3, die lip stain was highly inhibited by adding a suitable amount of antioxidant to resin composition as the preferred embodiment of the first invention. It can also be recognized that the amount of antioxidant is preferably 10–500 ppm, especially preferably 20–300 ppm based on the resin composition and if the amount is more than 1000 ppm, die lip stain rather increases. As mentioned above, it can be seen that the photographic support of the first invention containing a suitable amount of antioxidant is an excellent photographic support which provides high sharpness of printed image, is apparently white and besides shows little die lip stain at production of the support and thus has good surface property.

EXAMPLES 11–17 and COMPARATIVE EXAMPLES 12–16

The procedure of Example 5 was repeated except that the titanium dioxide pigment prepared in the following manner was used in place of the rutile type titanium dioxide pigment used in Example 6.

The rutile type titanium dioxide clinker obtained after the calcination in the sulfuric acid method explained herebefore was subjected to grinding and dressing and further to wet grinding and classification to obtain a titanium dioxide slurry containing substantially no coarse titanium dioxide particles.

This slurry was charged in a reaction tank and pH of the slurry was raised to about 9.2 with sodium hydroxide. The slurry was heated to about 70° C. Thereafter, to the slurry were added aqueous sodium aluminate solution or/and aqueous sodium silicate solution so that the surface of the titanium dioxide was coated with metal composition in an amount as shown in Table 4 in terms of $Al_2O_3$ or/and $SiO_2$ based on the dry weight of the titanium dioxide and then the slurry was left to stand for 30 minutes. In the case of coating the surface with hydrated titanium oxide, before raising pH of titanium dioxide slurry with sodium hydroxide, aqueous titanyl sulfate solution was added to the slurry so that the surface was coated with titanium composition in an amount as shown in Table 4 in terms of $TiO_2$ based on the dry weight of the titanium dioxide. Thereafter, rutile type titanium dioxide pigments as shown in Table 4 were prepared in the same manner as in Example 1.

The results obtained are shown in Table 4.

TABLE 4

| | Kind of compound coated on the surface of rutile type titanium dioxide pigment and coating amount*11 | | | | Apparent*12 white-ness | Total*12 number of die lip stain | CTF*12 (sharp-ness of printed image) | Light*12 resist-ance (optical density) |
|---|---|---|---|---|---|---|---|---|
| | $Al_2O_3$ | $SiO_2$ | $TiO_2$ | Total amount | | | | |
| Example 11 | 0.25 | 0 | 0 | 0.25 | ○ | 0 | 0.70 | 0.07 |
| Example 12 | 0.5 | 0 | 0 | 0.5 | ○ | 0 | 0.71 | 0.05 |
| Example 13 | 0.75 | 0 | 0 | 0.75 | ○ | 0 | 0.71 | 0.05 |
| Example 14 | 1.0 | 0 | 0 | 1.0 | ○ | 0 | 0.70 | 0.05 |
| Example 15 | 1.25 | 0 | 0 | 1.25 | ○ | 1 | 0.71 | 0.05 |
| Example 16 | 0.5 | 0.1 | 0 | 0.6 | ○ | 3 | 0.70 | 0.05 |
| Example 17 | 0.5 | 0.1 | 0.1 | 0.7 | ○ | 4 | 0.70 | 0.05 |
| Comparative Example 12 | 0.15 | 0 | 0 | 0.15 | ○ | 0 | 0.68 | 0.11 |
| Comparative Example 13 | 1.6 | 0 | 0 | 1.6 | ○ | 52 | 0.68 | 0.05 |
| Comparative Example 14 | 0 | 0.5 | 0 | 0.5 | ○ | 63 | 0.69 | 0.06 |
| Comparative Example 15 | 1.0 | 0 | 0.6 | 1.6 | ○ | 57 | 0.68 | 0.05 |
| Comparative Example 16 | 0.75 | 0.5 | 0 | 1.25 | ○ | more than 100 | 0.68 | 0.05 |

*11 Amount (% by weight) of metal composition coated on the surface of titanium dioxide in terms of $Al_2O_3$, $SiO_2$ and $TiO_2$ based on the dry weight of titanium dioxide when the surface of titanium dioxide was treated with hydrated alumina, hydrated silicon dioxide and/or hydrated titanium dioxide
*12 Same as in Table 2.

As can be seen from Table 4, the photographic supports (Examples 11–17) of the first invention where rutile type titanium dioxide the surface of which was coated with aluminum-containing metal component in an amount of more than 0.2% by weight, but less than 1.5% by weight in terms of anhydrous metal oxide based on the weight of the titanium dioxide and with silicon component in an amount of 0–0.4% by weight in terms of anhydrous silicon oxide was used as titanium dioxide pigment in resin layer of resin-coated paper were excellent photographic supports which can provide high sharpness of printed image, are apparently white and show little die lip stain at production thereof and thus have good surface property. Furthermore, it can be recognized that hydrated alumina is preferred as the surface treating agent for titanium dioxide from the points of inhibition of die lip stain and light resistance of photographic support, and coating amount thereof is preferably 0.4–1.25% by weight in terms of $Al_2O_3$ based on the weight of titanium dioxide.

On the other hand, the comparative photographic supports (Comparative Examples 12–16) had problems. That is, even if rutile type titanium dioxide was used, when surface thereof was coated with metal composition in an amount of 1.5% by weight or more in terms of anhydrous metal oxide based on the weight of titanium dioxide (Comparative Examples 13 and 15) and when the surface thereof was coated with silicon composition in an amount of 0.5% by weight or more in terms of $SiO_2$ based on the weight of titanium dioxide (Comparative Examples 14 and 16), much die lip stain occurred. Furthermore, when titanium dioxide the surface of which was coated with metal composition in an amount of 0.25% by weight or less in terms of anhydrous metal oxide based on the weight of titanium dioxide was used (Comparative Example 12), light resistance was inferior.

EXAMPLES 18–25 AND COMPARATIVE EXAMPLE 17

Procedure of Example 5 was repeated except that content of fluorescent agent [IX] in the resin layer was changed as shown in Table 5. In this case, in order not to change weighted-mean MFR of polyethylene resin, when content of the fluorescent agent was reduced, amount of masterbatch of the fluorescent agent was reduced and low-density polyethylene used for preparation of said masterbatch was added as diluent resin in an amount corresponding to the reduced amount of masterbatch of the fluorescent agent. On the other hand, when content of the fluorescent agent was increased, masterbatch of the fluorescent agent prepared in the same manner as in Example 1 was added to low-density polyethylene corresponding to the diluent resin in Example 5 (namely, low-density polyethylene corresponding to the diluent resin in Example 1) and amount of low-density polyethylene for diluent resin corresponding to the amount of the added masterbatch of fluorescent agent was reduced.

The results obtained are shown in Table 5.

TABLE 5

| | Content of fluorescent agent in resin layer ($mg/m^2$) | Apparent whiteness *13 | Total number of die lip stain *13 |
|---|---|---|---|
| Comparative Example 17 | 0 | Δ | 0 |
| Example 18 | 0.1 | Δ | 0 |
| Example 19 | 0.2 | Δ | 0 |
| Example 20 | 0.5 | ○ | 0 |
| Example 21 | 3 | ○ | 0 |
| Example 22 | 6.3 | ○ | 0 |
| Example 23 | 15 | ○ | 1 |
| Example 24 | 25 | ○ | 2 |
| Example 25 | 50 | ○ | 4 |

*13: Same as in Table 2.

As is clear from Table 5, when content of the fluorescent agent in resin layer is less than 0.3 $mg/m^2$, apparent whiteness of the image forming side of photographic support is insufficient and when it is more than 25 $mg/m^2$, die lip stain tends to occur much. Thus, it can be seen that the content is preferably 0.3–25 $mg/m^2$. As shown above, the photographic supports of this invention which contain a proper amount of fluorescent agent show little die lip stain at production thereof and thus have good surface property, can provide printed images of high sharpness and besides have high apparent whiteness.

EXAMPLES 26–34 AND COMPARATIVE EXAMPLES 18–20 procedure of Example 5 was repeated except that low-density polyethylene for masterbatch and low-density polyethylene and high-density polyethylene for diluent resins having substantially the same density as of those used in Example 6, but having MFR as shown in Table 6 were used in place of those which were used in Example 6.

The results obtained are shown in Table 6.

Degree of neck-in of resin at production of photographic support was visually evaluated relative to influence thereof on processability and is shown as degree of neck-in which affected processability. Criteria for evaluation are as follows:

Neck-in causes no problem for processability "○"

Neck-in sometimes causes problem for processability "Δ"

Neck-in causes some problem for processability "Δ"

Neck-in causes problem for processability "x"

EXAMPLE 35

Procedure of Example 1 was repeated except that titanium dioxide pigment prepared in the following manner was used in place of the rutile type titanium dioxide pigment used in Example 1 to obtain the similar results to those obtained in Example 1.

In accordance with steps of production of rutile type titanium dioxide pigment by chlorine method mentioned hereinbefore and using the similar apparatus to that disclosed in U.S. Pat. No. 3,121,641, calcination decomposition was carried out by feeding, into a burning reaction column of 1500° C., simultaneously titanium tetrachloride, oxygen and aluminum chloride so that amount of aluminum compound was 0.15% by weight, 0.75% by weight or 1.6% by weight in terms of $Al_2O_3$ based on the weight of the titanium dioxide, followed by decomposition, grinding and dressing by centrifugal roller mill, and further wet grinding and classification to prepare titanium dioxide slurry containing substantially no coarse particles. This titanium dioxide slurry was subjected to the same subsequent treatments of filtration, washing, drying and finishing grinding as in Example 1 to prepare rutile type titanium dioxide pigment inside-treated with the aluminum compound.

TABLE 6

| | MFR of resin for masterbatch (g/10 min) | MFR of high-density polyethylene for diluent resin (g/10 min) | MFR of low-density polyethylene for diluent resin (g/10 min) | Weighted-mean MFR of resin*14 (g/10 min) | Apparent whiteness*14 | Total number of die lip stain*14 | CTF (sharpness) of printed image)*14 | Degree of neck-in |
|---|---|---|---|---|---|---|---|---|
| Comparative Example 18 | 3.5 | 4.0 | 3.5 | 3.60 | ○ | 14 | 0.70 | ○ |
| Example 26 | 5.5 | 4.0 | 3.5 | 4.18 | ○ | 7 | 0.70 | ○ |
| Example 27 | 3.5 | 7.0 | 6.0 | 5.48 | ○ | 3 | 0.71 | ○ |
| Example 28 | 10.0 | 4.0 | 3.5 | 5.49 | ○ | 2 | 0.70 | ○ |
| Example 29 | 3.5 | 7.0 | 8.0 | 6.50 | ○ | 0 | 0.71 | ○ |
| Example 30 | 6.0 | 9.0 | 6.0 | 6.60 | ○ | 0 | 0.71 | ○ |
| Example 31 | 8.0 | 7.0 | 6.0 | 6.78 | ○ | 0 | 0.71 | ○ |
| Example 32 | 6.0 | 7.0 | 8.0 | 7.22 | ○ | 0 | 0.71 | ○ |
| Example 33 | 6.0 | 7.0 | 10.0 | 8.24 | ○ | 0 | 0.70 | (Δ) |
| Example 34 | 10.0 | 7.0 | 10.0 | 9.40 | ○ | 0 | 0.69 | (Δ) |
| Comparative Example 19 | 10.0 | 7.0 | 12.0 | 10.42 | ○ | 0 | 0.68 | Δ |
| Comparative Example 20 | 12.0 | 9.0 | 12.0 | 11.40 | ○ | 0 | 0.67 | Δ~X |

*14Same as in Table 2.

As is clear from Table 6, the photographic supports of the first invention in which weighted-mean MFR of polyolefin resin constituting the resin layer is within the range of 4.0–9.5 g/10 min (Examples 26–34) have no problems in processability at production thereof, show little die lip stain and thus have good surface property, can provide printed image of high sharpness and have high apparent whiteness. It can also be seen that the weighted-mean MFR of resin is preferably 5.0–8.0 g/10 min so that formation of die lip stain can be more effectively inhibited and neck-in does not deteriorate processability.

On the other hand, in case of the comparative support in which weighted-mean MFR of resin is lower than 4.0 g/10 min (Comparative Example 18), much die lip stain occurred. Further, in case of the comparative supports in which weighted-mean MFR of resin was higher than 9.5 g/10 min (Comparative Examples 19 and 20), degree of neck-in was great to cause problem for processability and besides, sharpness of printed image decreased.

EXAMPLES 36–38

Procedure of Example 5 was repeated except that octadecyl-3,5-di-tert-butyl-4-hydroxy-hydrocinnamate, 2,2',2"-tris[3,5-di-tert-butyl-(4-hydroxyphenyl)propionyloxy] ethylisocyanurate or 1,3,5-tris(4-tert-butyl-3-hydroxy-2,6-dimethylbenzyl)isocyanurate was used in place of tetrakis [methylene-(3,5-di-tert-butyl-4-hydroxy-hydrocinnamate)] methane as antioxidant. The similar results to those of Example 6 were obtained.

EXAMPLES 39–48

Procedure of Example 5 was repeated except that fluorescent agent (I)–(VIII) or (X)–(XI) mentioned hereinbefore was used in place of fluorescent agent (IX).

As a result, excellent photographic supports were obtained as in Example 5.

EXAMPLES 49–52 AND COMPARATIVE EXAMPLES 21–35

Rutile type titanium dioxide clinker produced in accordance with the production procedure of rutile type titanium dioxide pigment by sulfuric acid method mentioned hereinbefore under calcination conditions predetermined so as to gain the particle diameter shown in Table 7 was subjected to grinding and dressing and further subjected to wet grinding and classification to obtain titanium dioxide slurry containing substantially. no coarse particles. This slurry was put in a reaction tank and pH of the slurry was raised to about 9.2 with sodium hydroxide. Then, this slurry was heated to about 70° C. and thereafter, thereto was added an aqueous sodium aluminate solution in an amount of 0.75% by weight or 1.9% by weight in terms of $Al_2O_3$ based on the dry weight of the titanium dioxide and the mixture was kept for 30 minutes.

pH of the slurry was lowered to 7.0 by addition of 20% sulfuric acid and the slurry was aged for 2 hours. Thereafter, the original liquid of titanium dioxide slurry surface-treated with hydrated alumina was filtrated by a filter press and successively, titanium dioxide cake in the filter press was washed with running water under predetermined conditions until the suspension electric conductivity defined hereabove reached 4 μΩ/cm.

Then, the titanium dioxide cake was dried and impact ground in a hammer mill having a quantitative feeder and further subjected to finishing grinding to produce rutile type titanium dioxide pigments the surface of which was treated with different amounts of hydrated alumina and which were different in particle diameter.

50 parts by weight of low-density polyethylene having a density of 0.918 g/cm$^3$ and an MFR of 8.0 g/10 min, 50 parts by weight of the titanium dioxide pigment obtained above and 2.5 parts by weight of zinc stearate were well kneaded at 150° C. by a Banbury mixer to prepare a masterbatch of titanium dioxide pigment.

Furthermore, 0.28 part by weight of fluorescent agent [IX] mentioned hereinbefore and 0.28 part by weight of zinc stearate were previously well mixed and the resulting mixture was well kneaded with 40 parts by weight of the same low-density polyethylene as used for preparation of the above titanium dioxide pigment masterbatch by Laboplast-mill at 135° C. to prepare a fluorescent agent masterbatch.

Furthermore, 50 parts by weight of Hostaperm pink E (manufactured by Hoechst AG) and 50 parts by weight of Sun Wax 171-P (polyethylene wax having a molecular weight of about 1500 and a softening point of 105° C.) were melt kneaded in a heating kneader and then subjected to dispersion treatment by a hot triple roll mill to obtain a flaky colored preblend. 0.2 part by weight of this preblend, 50 parts by weight of the same low-density polyethylene as used for preparation of the above titanium dioxide pigment masterbatch, 50 parts by weight of the above titanium dioxide pigment and 2.5 parts by weight of zinc stearate were well mixed by a Banbury mixer at 150° C. to prepare a titanium dioxide pigment masterbatch containing quinacridone pigment.

Furthermore, 50 parts by weight of the same low-density polyethylene as used for preparation of the above titanium dioxide pigment masterbatch, 50 parts by weight of the above titanium dioxide pigment, 1.25 part by weight of ultramarine (#2000 manufactured by Daiichi Kasei Co.) and 2.5 parts by weight of zinc stearate were well kneaded by a Banbury mixer at 150° C. to prepare a titanium dioxide pigment masterbatch containing ultramarine.

Then, on the back side of the same paper substrate as used in Example 1 was coated a mixture (1:1 in weight ratio) of a high-density polyethylene (density: 0.960 g/cm$^3$, MFR=5 g/10 min) and a low-density polyethylene (density: 0.923 g/cm$^3$, MFR=5 g/10 min) at a thickness of 30 μ at a resin temperature of 330° C. using a melt extrusion coater. Then, a resin composition composed of the titanium dioxide pigment masterbatch obtained above, the titanium dioxide pigment masterbatch containing ultramarine obtained above and the fluorescent agent masterbatch obtained above, the titanium dioxide pigment masterbatch containing quinacridone pigment obtained above and 20 parts by weight of a high-density polyethylene (density: 0.970 g/cm$^3$, MFR 7.0 g/10 min) and 49 parts by weight of a low-density polyethylene (density: 0.920 g/cm$^3$, MFR: 6.0 g/10 min) (54 parts by weight when fluorescent agent masterbatch was not added) as diluent resins at the mixing ratio as shown in Table 7 was melt extrusion coated on the right side of the above paper substrate at a thickness of 30 μm at a resin temperature of 320° C. to make polyethylene resin-coated paper type photographic supports of the second invention and comparative photographic supports. The right side coated with polyethylene containing titanium dioxide pigment was finished to completely smooth glossy surface and the back side coated with polyethylene was finished to matter surface such as that of paper.

Apparent whiteness of the side containing titanium dioxide pigment of the thus obtained polyethylene resin-coated paper type photographic support was evaluated in the same manner as in Example 1.

Further, degree of die lip stain was measured in the same manner as in Example 1.

In the same manner as in Example 1, color photographic papers having the above photographic support were produced and sharpness of printed images was measured.

The results obtained are shown in Table 7.

TABLE 7

| | Titanium dioxide pigment | | Amount of masterbatch (parts by weight) | | | |
|---|---|---|---|---|---|---|
| | Particle diameter *15 (μm) | Coating amount of surface treating agent *16 (% by weight) | White master batch *16 | Blue master-batch *16 | Fluorescent agent masterbatch | Red master-batch *17 |
| Comparative Example 21 | 0.101 | 0.75 | 26.0 | 0 | 0 | 0 |
| Comparative Example 22 | 0.101 | 0.75 | 16.2 | 7.2 | 5 | 2.6 |
| Comparative Example 23 | 0.101 | 1.9 | 16.2 | 7.2 | 5 | 2.6 |
| Comparative Example 24 | 0.124 | 0.16 | 16.2 | 7.2 | 5 | 2.6 |
| Comparative | 0.124 | 0.75 | 26.0 | 0 | 0 | 0 |

TABLE 7-continued

| | | | | | | |
|---|---|---|---|---|---|---|
| Example 25 | | | | | | |
| Comparative Example 26 | 0.124 | 0.75 | 23.4 | 0 | 0 | 2.6 |
| Comparative Example 27 | 0.124 | 0.75 | 26.0 | 0 | 5 | 0 |
| Example 49 | 0.124 | 0.75 | 23.4 | 0 | 5 | 2.6 |
| Example 50 | 0.124 | 0.75 | 19.8 | 3.6 | 5 | 2.6 |
| Comparative Example 28 | 0.124 | 0.75 | 18.8 | 7.2 | 0 | 0 |
| Comparative Example 29 | 0.124 | 0.75 | 16.2 | 7.2 | 0 | 2.6 |
| Example 51 | 0.124 | 0.75 | 18.8 | 7.2 | 5 | 0 |
| Example 52 | 0.124 | 0.75 | 16.2 | 7.2 | 5 | 2.6 |
| Comparative Example 30 | 0.124 | 1.9 | 26.0 | 0 | 0 | 0 |
| Comparative Example 31 | 0.124 | 1.9 | 18.8 | 7.2 | 0 | 0 |
| Comparative Example 32 | 0.124 | 1.9 | 16.2 | 7.2 | 5 | 2.6 |
| Comparative Example 33 | 0.167 | 0.75 | 26.0 | 0 | 0 | 0 |
| Comparative Example 34 | 0.167 | 0.75 | 16.2 | 7.2 | 5 | 2.6 |
| Comparative Example 35 | 0.167 | 1.9 | 16.2 | 7.2 | 5 | 2.6 |

| | Amount of low-density polyethylene for diluent resin (part by weight) | Total number of die lip stain *16 | CTF (Sharpness of printed image) *16 | Apparent whiteness |
|---|---|---|---|---|
| Comparative Example 21 | 54 | 8 | 0.69 | × |
| Comparative Example 22 | 49 | 18 | 0.68 | ⊚ |
| Comparative Example 23 | 49 | more than 100 | 0.69 | ⊚ |
| Comparative Example 24 | 49 | 3 | 0.69 | ⊚ |
| Comparative Example 25 | 54 | 1 | 0.72 | × |
| Comparative Example 26 | 54 | 3 | 0.72 | × |
| Comparative Example 27 | 49 | 3 | 0.72 | Δ |
| Example 49 | 49 | 4 | 0.72 | ○ |
| Example 50 | 49 | 5 | 0.72 | ⊚ |
| Comparative Example 28 | 54 | 3 | 0.71 | × |
| Comparative Example 29 | 54 | 4 | 0.72 | Δ |
| Example 51 | 49 | 4 | 0.72 | ⊚ |
| Example 52 | 49 | 5 | 0.72 | ⊚ |
| Comparative Example 30 | 54 | 65 | 0.72 | × |
| Comparative Example 31 | 54 | more than 100 | 0.71 | × |
| Comparative Example 32 | 49 | more than 100 | 0.71 | ⊚ |
| Comparative Example 33 | 54 | 2 | 0.65 | × |
| Comparative Example 34 | 49 | 10 | 0.65 | ⊚ |
| Comparative Example 35 | 49 | more than 100 | 0.65 | ⊚ |

*15: Number-average diameter defined hereinbefore.
*16: Same as in Table 1
*17: Amount (part by weight) of titanium dioxide pigment containing quinacridone pigment.

As is clear from Table 7, the resin-coated paper type photographic supports of the second invention which contain in the resin layer on the image-forming side a titanium dioxide pigment which have a number-average diameter of 0.110–0.150 μm and surface of which is coated with aluminum composition in an amount of more than 0.2% by weight, but less than 1.9% by weight in terms of $Al_2O_3$ based on the weight of the titanium dioxide, a substituent-containing bis(benzoxazolyl)stilbene fluorescent agent and a coloring pigment (Examples 49–52) provide printed images of high sharpness, are high in brightness and in apparent whiteness, show little die lip stain at production thereof and thus are good in surface property. It can be seen that especially the photographic supports where blue type pigment and magenta type pigment are used in combination in resin layer (Examples 49 and 52) are superior in apparent whiteness.

On the other hand, it can be seen that comparative photographic supports (Comparative Examples 21–35) have problems. That is, photographic supports (Comparative Examples 21–23) containing titanium dioxide pigment of less than 0.110 μm in particle diameter in resin layer showed much die lip stain and gave printed images of low sharpness. The photographic support (Comparative Example 21) containing neither coloring pigment nor fluorescent agent in resin layer was less in formation of die lip stain, but considerably inferior in apparent whiteness. On the other hand, those which contained titanium dioxide pigment having a particle diameter of more than 0.150 μm (Comparative Examples 33–35) gave printed images of low sharpness. Furthermore, even if photographic support contained titanium dioxide pigment having a particle diameter of 0.110–0.150 μm in resin layer, when coating amount of the aluminum composition on the surface of titanium dioxide pigment was 1.8% by weight or more (Comparative Examples 30–32), occurrence of die lip stain was much and when the coating amount was 0.2% by weight or less (Comparative Example 24), many fine foreign matters or particles called microgrit were formed on the surface of resin containing the titanium dioxide pigment and besides, the surface yellowed when subjected to irradiation for 120 hours by a fadeometer (FAL-25X-HCL manufactured by Suga Tester Co.). Furthermore, when resin layer contained neither the fluorescent agent nor coloring pigment (Comparative Examples 25–29), apparent whiteness was very low.

EXAMPLES 53–57 AND COMPARATIVE EXAMPLES 36–39

Procedure of Example 52 was repeated except that titanium dioxide pigments having the number-average diameter shown in Table 8 was used in place of the titanium dioxide pigment used in Example 53.

The results obtained are shown in Table 8.

TABLE 8

| | Particle diameter of titanium dioxide pigment (μm)*[18] | Total number of die lip stain*[18] | CTF (sharpness of printed image)*[18] | Apparent whiteness |
|---|---|---|---|---|
| Comparative Example 36 | 0.096 | 25 | 0.67 | ◎ |
| Comparative Example 37 | 0.101 | 17 | 0.68 | ◎ |
| Example 53 | 0.110 | 9 | 0.70 | ◎ |
| Example 54 | 0.115 | 6 | 0.72 | ◎ |
| Example 55 | 0.124 | 5 | 0.72 | ◎ |
| Example 56 | 0.135 | 4 | 0.71 | ◎ |
| Example 57 | 0.148 | 4 | 0.68 | ◎ |
| Comparative Example 38 | 0.167 | 4 | 0.65 | ◎ |
| Comparative Example 39 | 0.187 | 3 | 0.64 | ◎ |

*[18]Same as in Table 7.

As can be seen from Table 8, the resin-coated paper type photographic supports of the second invention (Examples 53–57) containing titanium dioxide pigment of 0.110–0.150 μm in number-average diameter in the resin layer on the image-forming side are excellent photographic supports which can provide printed image of high sharpness, show little formation of die lip stain at production thereof and thus have good surface property and high apparent whiteness. It can be recognized that especially the photographic supports containing titanium dioxide pigment of 0.115–0.135 μm in number-average diameter in resin layer can provide printed image of especially high sharpness and show very little die lip stain and thus are especially excellent.

On the other hand, those which contained titanium dioxide pigment having a number-average diameter of less than 0.110 μm in resin layer (Comparative Examples 36–37) showed much die lip stain and gave printed image of low sharpness. Those which contained titanium dioxide pigment having a number-average diameter of more than 0.150 μm in resin layer (Comparative Examples 38–39) provided printed image of low sharpness.

EXAMPLES 58–66

Procedure of Example 52 was repeated except that as the low-density polyethylene resin for master-batch was used the low-density polyethylene resin for masterbatch used in Example 52 to which tetrakis-[methylene(3,5-di-tert-butyl-4-hydroxy-hydrocinnamate)]-methane was previously added in such amount as shown in Table 9 as antioxidant.

The results obtained are shown in Table 9.

TABLE 9

| | Amount of antioxidant*[19] (ppm) | Total number of die lip stain*[20] | CTF (sharpness of printed image)*[20] | Apparent whiteness |
|---|---|---|---|---|
| Example 58 | 0 | 5 | 0.72 | ◎ |
| Example 59 | 10 | 3 | 0.73 | ◎ |
| Example 60 | 20 | 1 | 0.72 | ◎ |
| Example 61 | 150 | 0 | 0.73 | ◎ |
| Example 62 | 300 | 0 | 0.73 | ◎ |
| Example 63 | 500 | 1 | 0.71 | ◎ |
| Example 64 | 1000 | 1 | 0.71 | ◎ |
| Example 65 | 1500 | 2 | 0.70 | ◎ |
| Example 66 | 2000 | 4 | 0.69 | ◎ |

*[19]Amount (ppm) of antioxidant added based on the resin composition on the side containing titanium dioxide pigment.
*[20]Same as in Table 1.

As can be seen from Table 9, die lip stain was highly inhibited by containing an antioxidant in resin layer. It can also be recognized that the content of antioxidant is preferably 10–1500 ppm, especially preferably 20–1000 ppm based on the resin composition. As mentioned above, it can be seen that the photographic support of the second invention containing a suitable amount of antioxidant is an excellent photographic support which provides high sharpness of printed image and besides shows little die lip stain at production of the support and thus has good surface property.

EXAMPLES 67–74 AND COMPARATIVE EXAMPLES 40–44

The procedure of Example 62 was repeated except that the titanium dioxide pigment having a number-average diameter of 0.124 μm and coated with metal composition in an amount as shown in Table 10 was used in place of the titanium dioxide pigment used in Example 62.

In this case, the titanium dioxide pigment surface-treated with various kinds and amounts of hydrated metal oxide was prepared in the following manner.

The titanium dioxide slurry prepared in the same manner as in Example 49 was charged in a reaction tank and pH of the slurry was raised to about 9.2 with sodium hydroxide. The slurry was heated to about 70° C. Thereafter, to the slurry were added aqueous sodium aluminate solution or/and aqueous sodium silicate solution so that the surface of the titanium dioxide was coated with metal composition in an amount as shown in Table 10 in terms of $Al_2O_3$ or/and $SiO_2$ based on the dry weight of the titanium dioxide and then the slurry was left to stand for 30 minutes. In the case of coating the surface with hydrated titanium oxide, before raising pH of titanium dioxide slurry with sodium hydroxide, aqueous titanyl sulfate solution was added to the slurry so that the surface was coated with titanium composition in an amount as shown in Table 10 in terms of $TiO_2$ based on the dry weight of the titanium dioxide. Thereafter, rutile type titanium dioxide pigments as shown in Table 10 were prepared in the same manner as in Example 49.

The results obtained are shown in Table 10.

nium dioxide the surface of which was coated with metal composition in an amount of 0.2% by weight or less in terms of anhydrous metal oxide based on the weight of titanium dioxide was used (Comparative Example 40), light resistance was inferior.

EXAMPLES 75–77

Procedure of Example 62 was repeated except that octadecyl-3,5-di-tert-butyl-4-hydroxy-hydrocinnamate, 2,2', 2"-tris[(3,5-di-tert-butyl-4-hydroxyphenyl)propionyloxy] ethylisocyanurate or 1,3,5-tris(4-tert-butyl-3-hydroxy-2,6-dimethylbenzyl)isocyanurate was used in place of tetrakis [methylene-(3,5-di-tert-butyl-4-hydroxy-hydrocinnamate)] methane as antioxidant. The similar results to those of Example 62 were obtained.

TABLE 10

| | Kind and amount of surface treating agent coated on titanium dioxide pigment *21 | | | | Total number of die lip | Sharpness of printed | Apparent |
|---|---|---|---|---|---|---|---|
| | $Al_2O_3$ | $SiO_2$ | $TiO_2$ | Total amount | stain *21 | image *21 | whiteness |
| Example 67 | 0.25 | 0 | 0 | 0.25 | 0 | 0.71 | ◎ |
| Example 68 | 0.5 | 0 | 0 | 0.5 | 0 | 0.73 | ◎ |
| Example 69 | 0.75 | 0 | 0 | 0.75 | 0 | 0.73 | ◎ |
| Example 70 | 1.0 | 0 | 0 | 1.0 | 0 | 0.73 | ◎ |
| Example 71 | 1.25 | 0 | 0 | 1.25 | 1 | 0.72 | ◎ |
| Example 72 | 1.7 | 0 | 0 | 1.7 | 8 | 0.71 | ◎ |
| Example 73 | 0.5 | 0.1 | 0 | 0.6 | 3 | 0.72 | ◎ |
| Example 74 | 0.5 | 0.1 | 0.1 | 0.7 | 4 | 0.72 | ◎ |
| Comparative Example 40 | 0.19 | 0 | 0 | 0.15 | 0 | 0.69 | ◎ |
| Comparative Example 41 | 1.9 | 0 | 0 | 1.9 | 69 | 0.70 | ◎ |
| Comparative Example 42 | 0 | 0.5 | 0 | 0.5 | 86 | 0.70 | ◎ |
| Comparative Example 43 | 1.3 | 0 | 0.6 | 1.9 | 75 | 0.71 | ◎ |
| Comparative Example 44 | 0.75 | 0.5 | 0 | 0.25 | more than 100 | 0.69 | ◎ |

*21: Same as in Table 1.

As can be seen from Table 10, the photographic supports (Examples 67–74) of the second invention where titanium dioxide the surface of which was coated with aluminum-containing metal composition in an amount of more than 0.2% by weight, but less than 1.8% by weight in terms of anhydrous metal oxide based in the weight of the titanium dioxide and with silicon composition in an amount of 0–0.4% by weight in terms of silicon dioxide was used as titanium dioxide pigment in resin layer of resin-coated paper were excellent photographic supports which can provide high sharpness of printed image, are apparently white and show little die lip stain at production thereof and thus have good surface property. Furthermore, it can be recognized that hydrated alumina is preferred as the surface treating agent for titanium dioxide from the points of inhibition of die lip stain and coating amount thereof is preferably 0.4–1.25% by weight in terms of $Al_2O_3$ based on the weight of titanium dioxide.

On the other hand, the comparative photographic supports (Comparative Examples 40–44) had problems. That is, when surface thereof was coated with metal composition in an amount of 1.8% by weight or more in terms of anhydrous metal oxide based on the weight of titanium dioxide (Comparative Examples 41 and 43) and when the surface thereof was coated with silicon composition in an amount of 0.5% by weight or more in terms of $SiO_2$ based on the weight of titanium dioxide (Comparative Examples 42 and 44), much die lip stain occurred. Furthermore, when tita-

EXAMPLES 78–86 AND COMPARATIVE EXAMPLE 45

Procedure of Comparative Example 31 was repeated except that content of fluorescent agent [IX] in the resin layer in Example 62 was changed as shown in Table 11. In this case, when content of the fluorescent agent was reduced, amount of masterbatch of the fluorescent agent was reduced and low-density polyethylene used for preparation of said masterbatch was added as diluent resin in an amount corresponding to the amount reduced. On the other hand, when content of the fluorescent agent was increased, masterbatch of the fluorescent agent prepared in the same manner as in Example 53 was added to low-density polyethylene corresponding to the diluent resin in Example 62 (namely, low-density polyethylene corresponding to the diluent resin in Example 52) and amount of low-density polyethylene for diluent resin corresponding to the amount in the added masterbatch of fluorescent agent was reduced.

The results obtained are shown in Table 11.

TABLE 11

| | Content of fluorescent agent in resin layer (mg/m²) | Apparent whiteness*22 | Total number of die lip stain*22 |
|---|---|---|---|
| Comparative Example 45 | 0 | Δ | 0 |
| Example 78 | 0.1 | Δ | 0 |
| Example 79 | 0.2 | Δ | 0 |
| Example 80 | 0.5 | ○ | 0 |
| Example 81 | 3 | ⊚ | 0 |
| Example 82 | 6.3 | ⊚ | 0 |
| Example 83 | 10.5 | ⊚ | 0 |
| Example 84 | 15 | ⊚ | 1 |
| Example 85 | 25 | ⊚ | 2 |
| Example 86 | 50 | ⊚ | 5 |

*22Same as in Table 2.

As is clear from Table 11, when content of the fluorescent agent in resin layer is less than 0.3 $mg/m^2$, apparent whiteness of the image forming side of photographic support is insufficient and when it is more than 25 $mg/m^2$, die lip stain tends to occur much. Thus, it can be seen that the content is preferably 0.3–25 $mg/m^2$. As shown above, the photographic supports of the second invention which contain a proper amount of fluorescent agent show little die lip stain at production thereof and thus have good surface property, can provide printed images of high sharpness and besides have high apparent whiteness.

EXAMPLES 77–96

Example 83 was repeated except that fluorescent agent (I)–(VIII) or (X)–(XI) was used in place of fluorescent agent (IX).

As a result, excellent photographic supports were obtained as in Example 83.

EXAMPLE 97

Procedure of Example 52 was repeated except that titanium dioxide pigment prepared in the following manner was used in place of the rutile type titanium dioxide pigment used in Example 52 to obtain the similar results to those obtained in Example 52.

In accordance with steps of production of rutile type titanium dioxide pigment by chlorine method mentioned hereinbefore and using the similar apparatus to that disclosed in U.S. Pat. No. 3,121,641, calcination decomposition was carried out by feeding, into a burning reaction column of 1500° C., simultaneously titanium tetrachloride, oxygen and aluminum chloride so that amount of aluminum compound 0.15% by weight, 0.75% by weight or 1.6% by weight in terms of $Al_2O_3$ based on the weight of titanium dioxide pigment, followed by decomposition, grinding and dressing by centrifugal roller mill, further wet grinding and classification to obtain a titanium dioxide slurry containing substantially no coarse particles. This titanium dioxide slurry was subjected to the same subsequent treatments of filtration, washing, drying and finishing grinding as in Example 52 to prepare rutile type titanium dioxide pigment inside-treated with the aluminum compound.

EXAMPLES 98–102 AND COMPARATIVE EXAMPLES 46–49

Example 52 was repeated except that anatase type titanium dioxide pigment prepared in the following manner was used in place of the rutile type titanium dioxide pigment used in Example 55.

Anatase type titanium dioxide clinker prepared under hydrolysis conditions and calcination conditions predetermined so that the particle diameter reached that shown in Table 12 in accordance with procedure for production of anatase type titanium dioxide pigment by sulfuric acid method mentioned hereinbefore was subjected to grinding and dressing and further to wet grinding and classification to obtain titanium dioxide pigment slurry containing substantially no course particles of titanium dioxide. This slurry was put in a reaction tank to coat the surface of the titanium dioxide with hydrated aluminum oxide in an amount of 0.75% by weight in terms of $Al_2O_3$ based on the dry weight of the titanium dioxide in the same manner as in Example 1, followed by washing, drying, and finishing grinding to obtain anatase type titanium dioxide pigments coated with hydrated aluminum oxide which were different in particle diameter.

The results obtained are shown in Table 12.

TABLE 12

| | Particle diameter of titanium dioxide pigment*23 (μm) | Total number of die lip stain*23 | CTF (sharpness of printed image)*23 | Apparent whiteness |
|---|---|---|---|---|
| Comparative Example 46 | 0.094 | 27 | 0.54 | ⊚ |
| Comparative Example 47 | 0.102 | 18 | 0.55 | ⊚ |
| Example 98 | 0.110 | 10 | 0.57 | ⊚ |
| Example 99 | 0.117 | 6 | 0.58 | ⊚ |
| Example 100 | 0.125 | 5 | 0.58 | ⊚ |
| Example 101 | 0.135 | 4 | 0.58 | ⊚ |
| Example 102 | 0.149 | 4 | 0.57 | ⊚ |
| Comparative Example 48 | 0.165 | 4 | 0.55 | ⊚ |
| Comparative Example 49 | 0.187 | 3 | 0.54 | ⊚ |

*23Same as in Table 1.

As can be seen from Table 12, the resin-coated paper type photographic supports of the second invention (Examples 98–102) containing titanium dioxide pigment which had a number-average diameter of 0.110–0.150 μm and the surface of which was coated with a specific amount of aluminum composition, fluorescent agent and color pigment in the resin layer on the image-forming side are excellent photographic supports which can provide printed image of high sharpness, is apparently white, show little formation of die lip stain at production thereof and thus have good surface property.

On the other hand, it can be seen that comparative photographic supports (Comparative Examples 46–49) have problems.

That is, those which contained titanium dioxide pigment having a number-average diameter of less than 0.110 μm in resin layer (Comparative Examples 46–47) showed much die lip stain and gave printed image of low sharpness. Those which contained titanium dioxide pigment having a number-average diameter of more than 0.150 μm in resin layer (Comparative Examples 48–49) provided printed image of low sharpness.

EXAMPLES 103–108 AND COMPARATIVE EXAMPLES 50–62

Rutile type titanium dioxide clinker prepared under such calcination conditions that particle diameter reached that shown in Table 13 in accordance with procedure of production of rutile type titanium dioxide pigment by sulfuric acid method referred to hereinbefore was subjected to grinding and dressing and further to wet grinding and classification to obtain titanium dioxide slurry containing substantially no coarse particles of titanium dioxide. This slurry was put in a reaction tank and thereto was added 10 wt% aqueous solution of $CaCl_2.6H_2O$ so that calcium compound was supported on the surface of titanium dioxide particles in an amount of 0.04% by weight in terms of calcium based on the weight of the titanium dioxide. Then, pH of the slurry was raised to about 9.2 with sodium hydroxide. Then, this slurry was heated to about 70° C. and thereafter, thereto was added an aqueous sodium aluminate solution in an amount of 0.75% by weight in terms of $Al_2O_3$ based on the dry weight of the titanium dioxide and the mixture was left to stand for 30 minutes.

pH of the slurry was lowered to 7.0 by addition of 20% sulfuric acid and the slurry was aged for 2 hours. Thereafter, the original liquid of titanium dioxide slurry surface treated with hydrated alumina was filtrated by a filter press and successively, titanium dioxide cake in the filter press was washed with running water under predetermined conditions until the suspension electric conductivity defined hereabove reached 45 μΩ/cm.

Then, the titanium dioxide cake was dried and impact ground in a hammer mill having a quantitative feeder and further subjected to finishing grinding to produce rutile type titanium dioxide pigments of different particle diameter which supported calcium compound on the surface.

50 parts by weight of low-density polyethylene having a density of 0.918 g/cm$^3$ and an MFR of 8.0 g/10 min or a low-density polyethylene having a density of 0.918 g/cm$^3$ and an MFR of 8.0 g/10 min and containing 135 ppm of tetrakis[methylene(3,5-di-tert-butyl-4-hydroxy-hydrocinnamate)]methane as an antioxidant, 50 parts by weight of the titanium dioxide pigment obtained above and 2.5 parts by weight of zinc stearate were well kneaded at 150° C. by a Banbury mixer to prepare a masterbatch of titanium dioxide pigment.

Separately, 50 parts by weight of the same low-density polyethylene as used for preparation of the above titanium dioxide pigment masterbatch, 50 parts by weight of the above titanium dioxide, 1.25 part by weight of ultramarine (#2000, manufactured by Daiichi Kasei Kogyo Co.) and 2.5 parts by weight of zinc stearate were well kneaded at 150° C. by a Banbury mixer to prepare a titanium dioxide pigment masterbatch containing ultramarine.

Furthermore, 0.28 part by weight of fluorescent agent [IX] mentioned hereinbefore and 0.28 part by weight of zinc stearate were previously well mixed and the resulting mixture was well kneaded with 40 parts by weight of the same low-density polyethylene as used for preparation of the above titanium dioxide pigment masterbatch in a Laboplastmill at 135° C. to prepare a fluorescent agent masterbatch.

On the back side of the same paper substrate as used in example 1 was coated a mixture (1:1 in weight ratio) of a high-density polyethylene (density: 0.960 g/cm$^3$, MFR=5 g/10 min) and a low-density polyethylene (density: 0.923 g/cm$^3$, MFR=5 g/10 min) at a thickness of 30 μm at a resin temperature of 330° C. using a melt extrusion coater. Then, a resin composition composed of 18.8 parts by weight of the titanium dioxide pigment masterbatch obtained above, 7.2 parts by weight of the titanium dioxide pigment masterbatch containing ultramarine obtained above, 3.0 parts by weight of the fluorescent agent masterbatch obtained above, 20 parts by weight of a high-density polyethylene (density: 0.970 g/cm$^3$, MFR: 7.0 g/10 min) and 51 parts by weight of a low-density polyethylene (density: 0.920 g/cm$^3$, MFR: 6.0 g/10 min) as diluent resins was melt extrusion coated on the right side of the above paper substrate at a thickness of 30 μm at a resin temperature of 330° C. to make polyethylene resin-coated papers of the third invention and comparative supports. The right side coated with polyethylene containing titanium dioxide pigment was finished to completely smooth glossy surface and the back side coated with polyethylene was finished to matter surface such as that of paper.

Apparent whiteness of the side containing titanium dioxide pigment of the thus obtained polyethylene resin-coated paper type photographic support was evaluated in the same manner as in Example 1.

Die lip stain and sharpness of printed image were also evaluated in the same manner as in Example 1.

The results obtained are shown in Table 13.

TABLE 13

| | In resin layer | | | | | |
|---|---|---|---|---|---|---|
| | Particle diameter of titanium dioxide pigment (μm) *24 | Presence or absence of antioxidant | Presence or absence of fluorescent agent | Total number of die lip stain *24 | CTF (sharpness of printed image) *24 | Apparent whiteness |
| Comparative Example 50 | 0.096 | Absent | Present | 16 | 0.67 | ○ |
| Comparative Example 51 | 0.101 | " | " | 10 | 0.69 | ○ |
| Comparative Example 52 | 0.110 | " | " | 5 | 0.71 | ○ |
| Comparative Example 53 | 0.115 | " | " | 4 | 0.71 | ○ |
| Comparative Example 54 | 0.124 | " | " | 3 | 0.70 | ○ |
| Comparative Example 55 | 0.135 | " | " | 3 | 0.68 | ○ |
| Comparative Example 56 | 0.148 | " | " | 3 | 0.65 | ○ |
| Comparative Example 57 | 0.167 | " | " | 3 | 0.64 | ○ |
| Comparative | 0.187 | " | " | 3 | 0.67 | ○ |

TABLE 13-continued

| | In resin layer | | | | | |
|---|---|---|---|---|---|---|
| | Particle diameter of titanium dioxide pigment (μm) *24 | Presence or absence of antioxidant | Presence or absence of fluorescent agent | Total number of die lip stain *24 | CTF (sharpness of printed image) *24 | Apparent whiteness |
| Example 58 | | | | | | |
| Comparative Example 59 | 0.096 | Present | " | 7 | 0.69 | ○ |
| Comparative Example 60 | 0.101 | " | " | 4 | 0.71 | ○ |
| Example 103 | 0.110 | Present | Present | 2 | 0.71 | ○ |
| Example 104 | 0.115 | " | " | 0 | 0.71 | ○ |
| Example 105 | 0.124 | " | " | 0 | 0.71 | ○ |
| Example 106 | 0.124 | " | Absent | 0 | 0.71 | Δ |
| Example 107 | 0.135 | " | Present | 0 | 0.70 | ○ |
| Example 108 | 0.148 | " | " | 0 | 0.68 | ○ |
| Comparative Example 61 | 0.167 | " | " | 0 | 0.65 | ○ |
| Comparative Example 62 | 0.187 | " | " | 1 | 0.64 | ○ |

*24: Same as in Table 7

As can be seen from Table 13, the resin-coated paper type photographic supports of the third invention which contain in the resin layer on the image forming side a titanium dioxide pigment which has a number-average diameter of 0.110–0.150 μm and which supports calcium compound on the surface and an antioxidant (Examples 103–108) provide printed images of high sharpness and show less die lip stain at production thereof and thus are good in surface property. It can be further seen that especially the photographic supports which contain titanium dioxide pigment having a particle size of 0.115–0.135 μm in the resin layer (Examples 104–107) can provide printed image of especially high sharpness and show little die lip stain and thus are especially excellent. Furthermore, photographic supports contain fluorescent agent in resin layer (Examples 103–105 and 107–108) are superior in apparent whiteness to that which contains no fluorescent agent (Example 106) and thus are especially excellent.

On the other hand, it can be seen that comparative photographic supports (Comparative Examples 50–62) have problems.

That is, photographic supports containing no antioxidant (Comparative Examples 50–58) showed much die lip stain and those which contain titanium dioxide pigment having a particle diameter of more than 0.150 μm (Comparative Examples 61–62) provide printed image of low sharpness.

Example 109

Example 105 was repeated except that titanium dioxide pigment which had a number-average diameter of 0.124 μm and which supported on the surface a calcium compound in an amount as shown in Table 14 in terms of calcium based on the weight of titanium dioxide was used.

The results obtained are shown in Table 14.

TABLE 14

| | Amount of calcium compound supported on the surface of particles of titanium dioxide pigment (% by weight)*25 | Total number of die lip stain*26 | CTF (sharpness of printed image)*26 | Apparent whiteness*26 |
|---|---|---|---|---|
| Comparative Example 63 | 0 | 4 | 0.67 | ○ |
| Comparative Example 64 | 0.001 | 4 | 0.67 | ○ |
| Comparative Example 65 | 0.002 | 2 | 0.69 | ○ |
| Example 109 | 0.004 | 1 | 0.70 | ○ |
| Example 110 | 0.01 | 0 | 0.71 | ○ |
| Example 111 | 0.04 | 0 | 0.71 | ○ |
| Example 112 | 0.07 | 0 | 0.70 | ○ |
| Comparative Example 66 | 0.10 | 1 | 0.69 | ○ |
| Comparative Example 67 | 0.15 | 2 | 0.67 | ○ |

*25 Amount (% by weight) in terms of calcium based on the weight of titanium dioxide.
*26 Same as in Table 2.

As can be seen from Table 14, the resin-coated type photographic supports of the third invention which contain in the resin layer titanium dioxide pigment the surface of which supports on the surface a calcium compound in an amount of 0.004–0.1% by weight based on the weight of the titanium dioxide (Examples 109–112) provide printed images of high sharpness and show occurrence of little die lip stain and thus have good surface property. On the other hand, comparative supports (Comparative Examples 63–67) support calcium compound in an amount of less than 0.004% by weight or more than 0.1% by weight in terms of calcium based on the weight of titanium dioxide provide printed image of low sharpness and show much die lip stain.

EXAMPLES 113–120 AND COMPARATIVE EXAMPLES 68

Procedure of Example 102 was repeated except that as the low-density polyethylene resin for master-batch, was used the low-density polyethylene resin for masterbatch used in Example 103 to which tetrakis[methylene(3,5-di-tert-butyl-4-hydroxy-hydrocinnamate)]-methane was previously added in such amount as shown in Table 15 as antioxidant.

The results obtained are shown in Table 15.

TABLE 15

| | Amount of antioxidant*27 (ppm) | Total number of die lip stain*28 | CTF (sharpness of printed image)*28 | Apparent whiteness |
|---|---|---|---|---|
| Comparative Example 68 | 0 | 5 | 0.70 | ○ |
| Example 113 | 10 | 2 | 0.71 | ○ |
| Example 114 | 20 | 0 | 0.71 | ○ |
| Example 115 | 60 | 0 | 0.71 | ○ |
| Example 116 | 150 | 0 | 0.71 | ○ |
| Example 117 | 300 | 0 | 0.71 | ○ |
| Example 118 | 500 | 1 | 0.70 | ○ |
| Example 119 | 1000 | 2 | 0.69 | ○ |
| Example 120 | 2000 | 3 | 0.68 | ○ |

*27 Addition amount (ppm) based on the resin composition on the side containing titanium dioxide.
*28 Same as in Table 13.

As can be seen from Table 15, occurrence of die lip stain can be effectively inhibited by containing an antioxidant in resin layer of resin-coated paper type photographic support. It can be also seen that content of the antioxidant is preferably 10–1000 ppm, especially preferably 20–500 ppm based on the resin composition. Thus, it can be seen that the photographic supports of the third invention containing a proper amount of antioxidant can provide printed image of high sharpness and show little die lip stain at production thereof and thus have good surface property.

EXAMPLES 121 and 122

Example 109 was repeated except that titanium dioxide pigment having a number-average diameter of 0.124 μm and supporting on the surface various amounts of a magnesium compound or a barium compound was used in place of the titanium dioxide pigment used in Example 109.

In this case, the titanium dioxide was prepared in the same manner as in Example 103 and $MgSO_4.7H_2O$ or $BaCl_2.2H_2O$ was used in place of $CaCl_2.6H_2O$ used in Example 103.

Similar results to those of Example 109 were obtained.

EXAMPLES 123–125

Example 113 was repeated except that octadecyl-3,5-di-tert-butyl-4-hydroxy-hydrocinnamate, 2,2', 2"-tris[(3,5-di-tert-butyl-4-hydroxyphenyl)-propionyloxy]ethylisocyanurate or 1,3,5-tris(4-tert-butyl-3-hydroxy-2,6-dimethylbenzyl)isocyanurate was used in place of the antioxidant tetrakis[methylene(3,5-di-tert-butyl-4-hydroxy-hydrocinnamate)]methane used in Example 109, to obtain the similar results to those of Example 113.

EXAMPLES 126–127 AND COMPARATIVE EXAMPLES 69–73

Example 103 was repeated except that anatase type titanium dioxide pigment prepared in the following manner was used in place of the rutile type titanium dioxide pigment used in Example 103.

Anatase type titanium dioxide clinker prepared under hydrolysis and calcination conditions predetermined so that particle diameter reached that shown in Table 16 in accordance with procedure of production of anatase type titanium dioxide pigment by sulfuric acid method referred to hereinbefore was subjected to grinding and dressing and further to wet grinding and classification to obtain titanium dioxide slurry containing substantially no coarse particles of titanium dioxide. This slurry was put in a reaction tank and thereto was added 10 wt% aqueous solution of $CaCl_2.6H_2O$ so that calcium compound was supported on the surface of titanium dioxide particles in an amount of 0.04% by weight in terms of calcium based on the weight of the titanium dioxide. Then, the titanium dioxide was subjected to surface-treatment with hydrated aluminum oxide as in Example 103, then to washing, drying and finishing grinding to obtain anatase type titanium dioxide pigment different in particle diameter which supported calcium compound on the surface.

The results obtained are shown in Table 16.

TABLE 16

| | Resin layer | | | | | |
|---|---|---|---|---|---|---|
| | Particle diameter of titanium dioxide pigment (μm) *29 | Presence or absense of antioxidant | Presence or absence of fluorescent agent | Total number of die lip stain *29 | CTF (sharpness of printed image) *29 | Apparent whiteness |
| Comparative Example 69 | 0.108 | Absent | Present | 7 | 0.54 | ○ |
| Comparative Example 70 | 0.122 | " | " | 3 | 0.58 | ○ |
| Comparative Example 71 | 0.153 | " | " | 3 | 0.55 | ○ |
| Comparative Example 72 | 0.108 | Present | " | 2 | 0.54 | ○ |
| Example 126 | 0.122 | " | " | 0 | 0.58 | ○ |
| Example 127 | 0.122 | " | Absent | 0 | 0.58 | ◎ |
| Comparative Example 73 | 0.153 | " | Present | 0 | 0.55 | ○ |

*29: Same as in Table 13.

As can be seen from Table 16, the resin-coated paper type photographic supports of the third invention which contain in resin layer thereof titanium dioxide pigment which has a particle diameter of 0.110–0.150 μm and supports on the surface a calcium compound and an antioxidant (Examples 126–127) provide printed image of high sharpness, show a little die lip stain at production thereof and thus have good surface property.

On the other hand, the comparative photographic supports (Comparative Examples 69–73) have problems.

That is, it can be seen that those which contain no antioxidant in resin layer (Comparative Examples 69–71) show formation of much die lip stain and that which contains antioxidant, but contains titanium dioxide pigment having a particle diameter of less than 0.110 μm (Comparative Example 72) shows formation of much die lip stain and provides printed image of low sharpness and on the other hand, that which contains titanium dioxide having a particle diameter of more than 0.150 μm (Comparative Example 73) provides printed image of low sharpness.

What is claimed is:

1. A photographic support consisting essentially of a substrate and a resin layer provided at least on the side of the substrate where images are to be formed, said resin layer comprising (A) a polyolefin resin or a polyolefin resin mixture, (B) a titanium dioxide pigment and (C) an antioxidant, said titanium dioxide pigment having a number-average diameter of 0.110–0.150 μm and having at least one compound selected from the group consisting of a magnesium compound, a calcium compound and a barium compound coated on the surface thereof in an amount of 0.004–0.1% by weight in terms of metal based on the weight of the titanium dioxide pigment.

2. A photographic support according to claim 1, wherein the titanium dioxide pigment has rutile structure.

3. A photographic support according to claim 1, wherein the antioxidant is a hindered phenol antioxidant.

4. A photographic support according to claim 1, wherein the antioxidant is contained in an amount of 10–1000 ppm based on the weight of the resin layer.

5. A photographic support according to claim 1, wherein the polyolefin resin is a polyethylene resin.

6. A photographic support according to claim 1, wherein the polyolefin resin mixture comprises two or more polyethylene resins.

7. A photographic support according to claim 1, wherein the resin layer additionally contains a metal salt of a higher fatty acid.

8. A photographic support according to claim 1, wherein the resin layer additionally contains a fluorescent agent.

9. A photographic support according to claim 8, wherein the fluorescent agent is a bis(benzoxazolyl)naphthalene fluorescent having a substituent or a bis(benzoxazolyl) stilbene fluorescent agent having a substituent.

10. A photographic support according to claim 8, wherein the fluorescent agent is contained in a proportion of 0.3–30 $mg/m^2$.

11. A photographic support according to claim 1, wherein the titanium dioxide pigment is contained in an amount of 9–30% by weight based on the weight of the resin layer.

12. A photographic support according to claim 1, wherein the titanium dioxide pigment has been ground in a fluid energy mill.

* * * * *